(12) United States Patent
Suzuta et al.

(10) Patent No.: US 9,211,472 B2
(45) Date of Patent: Dec. 15, 2015

(54) GAME DEVICE, GAME CONTROL METHOD, AND GAME CONTROL PROGRAM CONFIGURED TO CONTROL A GAME IN WHICH A CHARACTER IS MOVED ALONG A SHADOW

(75) Inventors: Ken Suzuta, Tokyo (JP); Tatsuya Suzuki, Tokyo (JP); Jun Fujiki, Fukuoka (JP); Takanori Kikuchi, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 346 days.

(21) Appl. No.: 13/394,603

(22) PCT Filed: Feb. 7, 2011

(86) PCT No.: PCT/JP2011/000653
§ 371 (c)(1),
(2), (4) Date: May 24, 2012

(87) PCT Pub. No.: WO2011/155102
PCT Pub. Date: Dec. 15, 2011

(65) Prior Publication Data
US 2013/0072302 A1    Mar. 21, 2013

(30) Foreign Application Priority Data

Jun. 11, 2010   (JP) ................................ 2010-134160
Jun. 11, 2010   (JP) ................................ 2010-134161
Jun. 14, 2010   (JP) ................................ 2010-135451

(51) Int. Cl.
*A63F 13/06*    (2006.01)
*A63F 13/20*    (2014.01)
(Continued)

(52) U.S. Cl.
CPC ................. *A63F 13/06* (2013.01); *A63F 13/04* (2013.01); *A63F 13/10* (2013.01); *G06T 15/50* (2013.01); *G06T 15/60* (2013.01); *G06T 19/00* (2013.01); *A63F 2300/1087* (2013.01);
(Continued)

(58) Field of Classification Search
USPC .......................................................... 463/36
See application file for complete search history.

(56) References Cited

U.S. PATENT DOCUMENTS 6,831,659 B1 * 12/2004   Miyashita et al. ............ 345/619
2002/0068626 A1 *  6/2002   Takeda et al. .................. 463/30
(Continued)

FOREIGN PATENT DOCUMENTS

JP    2003325974 A    11/2003
JP    2004130003 A     4/2004

OTHER PUBLICATIONS

Game Arts, The Magic Obelisk Game Trailer, Nov. 3, 2009, https://www.youtube.com/watch?v=u1N9r5dnkDk , pp. 1-2.*
(Continued)

*Primary Examiner* — Tramar Harper
(74) *Attorney, Agent, or Firm* — Matthew B. Dernier, Esq

(57) ABSTRACT

A game device includes a light control unit configured to change, in a game field in which an object is located, a position of a light source or a direction of radiation by light emitted from the light source based on a control command of a player, a shadow rendering unit configured to render a shadow of the object projected by light emitted from the light source onto a plane of projection defined in the game field; and a character control unit configured to move a character along the shadow of the object.

20 Claims, 17 Drawing Sheets

(51) Int. Cl.
*A63F 13/219* (2014.01)
*A63F 13/40* (2014.01)
*G06T 15/50* (2011.01)
*G06T 15/60* (2006.01)
*G06T 19/00* (2011.01)

(52) U.S. Cl.
CPC .. *A63F 2300/609* (2013.01); *A63F 2300/6607* (2013.01); *A63F 2300/6646* (2013.01)

(56) References Cited

U.S. PATENT DOCUMENTS

2007/0060342 A1* 3/2007 Sakaguchi et al. ............ 463/31
2009/0104992 A1 4/2009 Kouno

OTHER PUBLICATIONS

Game Arts, The Magic Obelisk Game How to movie part 1, Nov. 30, 2009, https://www.youtube.com/watch?v=X1k3MZxYYr0 , pp. 1-2.*

Game Arts, The Magic Obelisk Game How to movie part 2, Nov. 30, 2009, https://www.youtube.com/watch?v=tuLckr9ZEbk , pp. 1-2.*

Game Arts, The Magic Obelisk Game How to movie part 3, Nov. 30, 2009, https://www.youtube.com/watch?v=wrx4BN2UgC4 , pp. 1-2.*

Game Arts, The Magic Obelisk Game How to movie part 4, Nov. 30, 2009, https://www.youtube.com/watch?v=NjZrqRKqOoA, pp. 1-2.*

Game Arts, The Magic Obelisk Game How to movie part 5, Nov. 30, 2009, https://www.youtube.com/watch?v=PzE3uFgkrWo , pp. 1-2.*

Game Arts, The Magic Obelisk Game How to movie part 6, Nov. 30, 2009, https://www.youtube.com/watch?v=wDU2_UTZuyl , pp. 1-2.* wiiviewr, The Magic Obelisk Review, Jan. 9, 2010, https://www.youtube.com/watch?v=cSPih1avpNs , p. 1.*

International Preliminary Report on Patentability and Written Opinion for corresponding PCT Application No. PCT/JP2011/000653, dated Dec. 14, 2012.

International Search Report for corresponding PCT Application No. PCT/JP2011/000653, dated Apr. 26, 2011.

Shukan Fami Tsu, article concerning "Kage no To" [Tower of Shadow] vol. 24, No. 49/whole No. 1093, pp. 232-233, 6 pages provided, Nov. 26, 2009 (see Office Actions of JP Application No. 2010134160, dated Jul. 5, 2011 and Apr. 26, 2011 as well as the International Search Report of PCT/JP2011/000653, dated Apr. 26, 2011 for relevancy).

Shukan Fami Tsu, article concerning "Kage no To" vol. 25, No. 6/whole No. 1104, pp. 306-307, 6 pages provided, Jan. 28, 2010 (see International Search Report of PCT/JP2011/000653, dated Apr. 26, 2011 for relevancy).

Shukan Fami Tsu, article concerning "Kage no To" vol. 24, No. 35/whole No. 1080, pp. 36-37, 6 pages provided, Aug. 28, 2009 (see International Search Report of PCT/JP2011/000653, dated Apr. 26, 2011 for relevancy).

Wii "Kage no To" Koshiki Site, Internet<http://www.hudson,jp/kagenotou/> 5 pages provided Aug. 20, 2010 [retreival date Apr. 18, 2011] (see International Search Report of PCT/JP2011/000653, dated Apr. 26, 2011 for relevancy).

Office Action for corresponding JP Application No. 2010134160, dated Jul. 5, 2011.

Game Arts, "Shadow Walker Boy of Shadow, Fairy of Light: Official Site" internet: <http://shadow.gamearts.jp/index.html> 10 pages provided, Nov. 17, 2009 [searched on Jun. 14, 2011] (see Office Action of JP Application No. 2010134160, dated Jul. 5, 2011 and International Search Report of PCT/JP2011/000653, dated Apr. 26, 2011 for relevancy).

Office Action for corresponding JP Application No. 2010134160, dated Apr. 26, 2011.

Populous: The Beginning, official guide, Softbank Publishing Inc., Jul. 7, 1999, first edition, p. 5. (see copy of Japanese Office action cited below for relevancy).

Office Action for corresponding JP Application No. 2010134160, dated Aug. 14, 2012.

Office Action with Englsih translation for corresponding JP Application No. 2010-134161, dated May 13, 2014.

A boy challenges the mystery in a shadow!, Weekly Family Computer Communication, Kadokawa Corporation Enterbrain Brand Company, issued Nov. 26, 2009, No. 1093, 12 pages, pp. 232-233 (for relevancy see OA JP Application No. 2010-134161, dated May 13, 2014).

"Shado Operation Manual," [online], upload date: Dec. 27, 2008, The National College of Technology Programing Content Committee, pp. 1-12, Internet <URL: http://www.procon.gr.jp/modules/procontop/category.php?categoryid=21> searched May 1, 2014 (for relevancy see OA JP Application No. 2010-134161, dated May 13, 2014).

* cited by examiner

GAME DEVICE, GAME CONTROL METHOD, AND GAME CONTROL PROGRAM CONFIGURED TO CONTROL A GAME IN WHICH A CHARACTER IS MOVED ALONG A SHADOW

TECHNICAL FIELD

The present invention relates to a game control technology and, more particularly, to a game device, game control method, and game control program configured to control a game in which a character is moved along a shadow of an object located in a three-dimensional space.

BACKGROUND ART

A large number of games in which a character is moved and led to a certain goal in a game field produced by modeling a three-dimensional space are provided. Efforts are made to provide higher entertainment value by, for example, locating gimmicks of different tastes in a game field or locating an enemy character.

[patent document No. 1] United States Patent Application Publication 2009-0104992

SUMMARY OF THE INVENTION

We have developed a technology capable of providing a novel game where a character is moved along a shadow of an object located in a three-dimensional space.

In this background, a general purpose of the present invention is to provide a game control technology providing higher entertainment value.

One embodiment of the present invention relates to a game control program. The game control program comprises: a module configured to change, in a game field in which an object is located, a position of a light source or a direction of radiation by light emitted from the light source based on a control command of a player; a module configured to render a shadow of the object projected onto a plane of projection defined in the game field; and a module configured to move a character along the shadow of the object.

Another embodiment of the present invention relates to a game control program. The game control program comprises: a module configured to change, in a game field in which an object is located, a position of a light source or a direction of radiation by light emitted from the light source based on a control command of a player; a module configured to render a shadow of the object projected by the light emitted from the light source onto a plane of projection defined in the game field; and a module configured to determine whether a predetermined shape that should be formed by the shadow of the object is formed; and a module configured to invoke a predetermined function corresponding to the shadow of the predetermined shape when it is determined that the shadow of the predetermined shape is formed.

Still another embodiment of the present invention relates to a game control program. The game control program comprises: a module configured to change, in a game field in which an object is located, a position of a light source or a direction of radiation by light emitted from the light source based on a control command of a player; a module configured to render a shadow of the object projected by the light emitted from the light source onto a plane of projection defined in the game field; a module configured to move a character along the shadow of the object; a module configured to control a gimmick provided in the object and having a predetermined function; and a module configured to determine whether to invoke the function provided in the gimmick based on a state of the shadow of the object provided with the gimmick occurring when the character moves near the shadow of the object provided with the gimmick.

Optional combinations of the aforementioned constituting elements, and implementations of the invention in the form of methods, apparatuses, and systems may also be practiced as additional modes of the present invention.

According to the present invention, a game control technology offering higher entertainment value is provided.

DETAILED DESCRIPTION OF THE INVENTION

The game device according to an embodiment provides a game in which the position and shape of a shadow of an object located in a three-dimensional space are changed as the user controls the position of a light source and in which the character is moved along the shadow of the object. By realizing a phenomenon, i.e. movement of a character over a shadow, that could not possibly occur in a real world, novel entertainment that could not be enjoyed in a real world can be provided to users.

Figure 1:
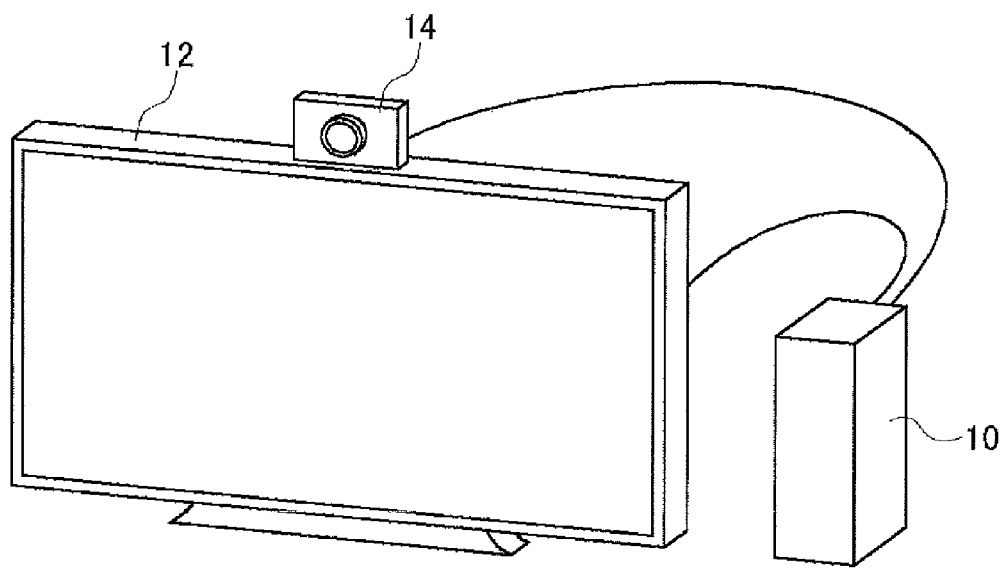
FIG. 1 shows an environment in which a game system 1 according to an embodiment of the present invention is used.
Figure 1:
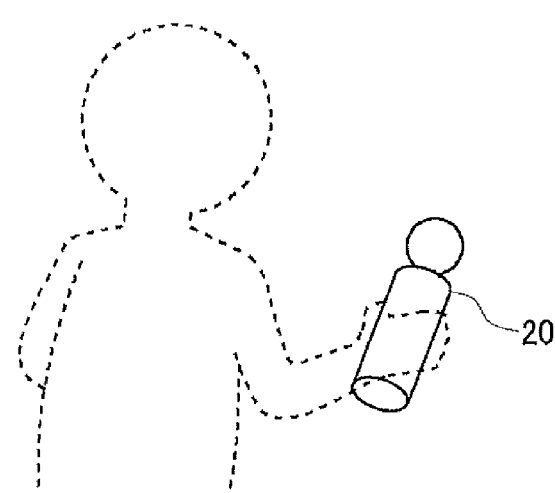

FIG. 1 shows an environment in which a game system 1 according to an embodiment of the present invention is used. The game system 1 comprises a game device 10 adapted to run game software, a display device 12 adapted to output the result of processing by the game device 10, an input device 20, and an imaging device 14 adapted to image the input device 20.

The input device 20 is a user input device that allows a user to provide a command. The game device 10 is a processing device adapted to run a game application in accordance with a user command provided via the input device 20 and generate an image signal indicating the result of processing the game application.

The input device 20 has the function of transferring a control command of a user to the game device 10 and is configured, according to the embodiment, as a wireless controller capable communicating with the game device 10 wirelessly.

The input device 20 and the game device 10 may establish wireless connection using the Bluetooth (registered trademark) protocol.

The input device 20 may not be a wireless controller but may be a wired controller connected to the game device 10 using a cable.

The input device 20 is driven by a battery and is provided with multiple buttons used to provide a user command to advance a game.

As the user operates the button of the input device 20, the control command is transmitted to the game device 10 wirelessly.

The game device 10 receives the user command from the input device 20, controls the progress of the game in accordance with the user command, and generates a game image signal. The generated game image signal is output from the display device 12.

The imaging device 14 is a video camera comprising a CCD imaging device, a CMOS imaging device, etc. The device 14 captures an image of a real space at predetermined intervals so as to generate periodical frame images. For example, the imaging device 14 may capture 30 images per second to match the frame rate of the display device 12. The imaging device 14 is connected to the game device 10 via a universal serial bus (USB) or another interface.

The display device 12 is a display that outputs an image and displays a game screen by receiving an image signal generated by the game device 10. The display device 12 may be a television set provided with a display and a speaker. Alternatively, the display device 12 may be a computer display. The display device 12 may be connected to the game device 10 using a cable. Alternatively, the device 12 may be wirelessly connected using a wireless local area network (LAN).

The input device 20 in the game system 1 according to the embodiment is provided with a light-emitting body. During the game, the light-emitting body emits light of a predetermined color, which is imaged by the imaging device 14. The imaging device 14 captures an image of the input device 20, generates a frame image accordingly, and supplies the image to the game device 10. The game device 10 acquires the frame image and derives information on the position of the light-emitting body in the real space by referring to the position and size of the image of the light-emitting body in the frame image. The game device 10 deals with the positional information as a command to control the game and reflects the information in game processing by, for example, controlling the action of a player's character. The game device 10 according to the embodiment is provided with the function of running a game program not only using a control input provided via the button of the input device 20 but also using the positional information of the acquired image of the light-emitting body.

The light-emitting body of the input device 20 is configured to emit light of multiple colors. The color emitted by the light-emitting body can be configured according to a command for light emission from the game device 10.

The input device 20 is provided with an acceleration sensor and a gyro sensor. The value detected by the sensor is transmitted to the game device 10 at predetermined intervals. The game device 10 acquires the value detected by the sensor so as to acquire information on the orientation of the input device 20 in the real space. The game device 10 deals with the orientation information as a user command in the game and reflects the information in game processing. Thus, the game device 10 according to the embodiment has the function of running a game application using the acquired orientation information of the input device 20.

Figure 2A:
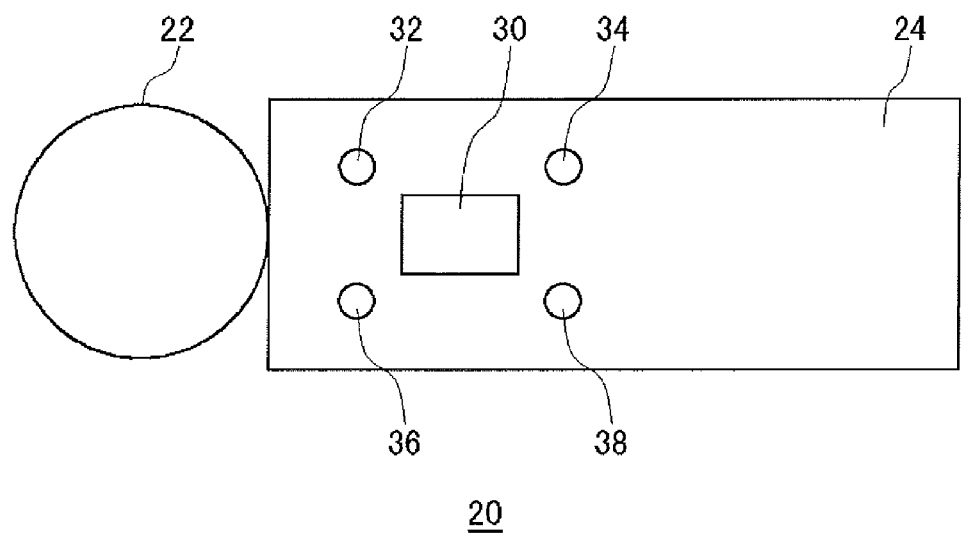
FIGS. 2A and 2B show the appearance of the input device.
Figure 2B:
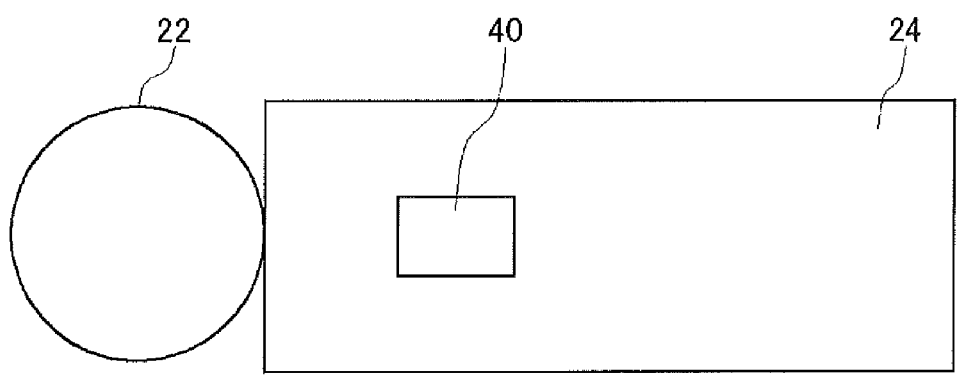

FIGS. 2A and 2B show the appearance of the input device 20. FIG. 2A shows the top surface of the input device 20, and FIG. 2B shows the bottom surface of the input device 20. The input device 20 comprises a light-emitting body 22 and a handle 24. The exterior of the light-emitting body 22 is formed of a light-transmitting resin into a spherical form. The light-emitting body 22 is provided with a light-emitting device such as a light-emitting diode or an electric bulb inside. When the light-emitting device inside emits light, the entirety of the exterior sphere is lighted. Control buttons 30, 32, 34, 36, and 38 are provided on the top surface of the handle 24, and a control button 40 is provided on the bottom surface. The user controls the control buttons 30, 32, 34, 36, and 38 with the thumb while holding the ends of the handle 24 with the user's hand. The control button 40 is controlled by the index finger. The control buttons 30, 32, 34, 36, and 38 are configured such that the buttons can be pressed. The user presses any of the buttons for use. The control button 40 may be used to enter an analog level.

The user plays the game viewing the game screen displayed on the display device 12. Because it is necessary to capture an image of the light-emitting body 22 while the game application is being run, the imaging device 14 is preferably oriented such that its imaging range faces the same direction in which the display device 12 faces. Typically, the user plays the game in front of the display device 12. Therefore, the imaging device 14 is arranged such that the direction of the light axis thereof is aligned with the frontward direction of the display device 12. More specifically, the imaging device 14 is preferably located to include in its imaging range those positions in the neighborhood of the display device 12 where the user can view the display screen of the display device 12. This allows the imaging device 14 to capture an image of the input device 12.

Figure 3:
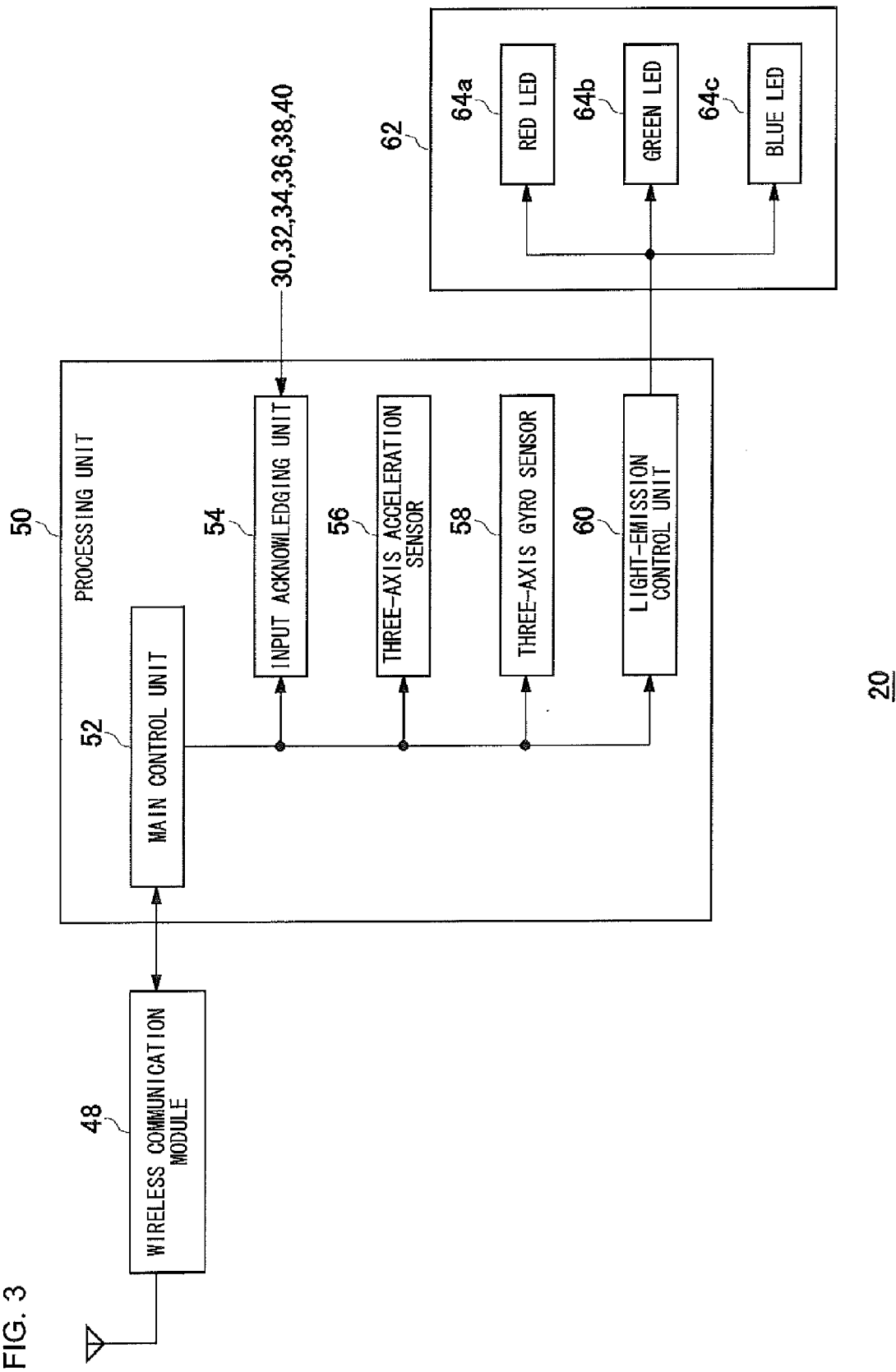
FIG. 3 shows the internal configuration of the input device.

FIG. 3 shows the internal configuration of the input device 20. The input device 20 comprises a wireless communication module 48, a processing unit 50, a light-emitting unit 62, and the control buttons 30, 32, 34, 36, 38, and 40. The wireless communication module 48 has the function of transmitting and receiving data to and from the wireless communication module of the game device 10. The processing unit 50 performs required processes in the input device 20.

The processing unit 50 comprises a main control unit 52, an input acknowledging unit 54, a three-axis acceleration sensor 56, a three-axis gyro sensor 58, and a light-emission control unit 60. The main control unit 52 exchanges necessary data with the wireless communication module 48.

The input acknowledging unit 54 acknowledges input information from the control buttons 30, 32, 34, 36, 38, and 40 and sends the information to the main control unit 52. The three-axis acceleration sensor 56 detects acceleration components in three directions defined by X, Y, and Z axes. The three-axis gyro sensor 58 detects angular velocity on the XZ plane, ZY plane, and YZ plane. In this example, the width direction of the input device 20 is defined as the X-axis, the height direction as the Y-axis, and the longitudinal direction as the Z-axis. The three-axis acceleration sensor 56 and the three-axis gyro sensor 58 are provided in the handle 24 of the input device 20 and, more preferably, in the neighborhood of the center of the handle 24. Along with the input information from the control buttons, the wireless communication module 48 sends information on the value detected by the three-axis acceleration sensor 56 and information on the value detected by the three-axis gyro sensor 58 to the wireless communication module of the game device 10 at predetermined intervals. The interval of transmission is set to, for example, 11.25 milliseconds.

The light-emission control unit 60 controls light emission from the light-emitting unit 62. The light-emitting unit 62 comprises a red LED 64a, a green LED 64b, a blue LED 64c and is capable of emitting light of multiple colors. The light-emission control unit 60 adjusts light-emission from the red LED 64a, green LED 64b, blue LED 64c so as to cause the light-emitting unit 62 to emit light of a desired color.

In response to a command from the game device 10 to emit light, the wireless communication module 48 supplies the command to the main control unit 52, whereupon the main control unit 52 supplies the command to the light-emission control unit 60. The light-emission control unit 60 controls light-emission from the red LED 64a, green LED 64b, blue LED 64c so as to cause the light-emitting unit 62 to emit light of a color designated by the command. For example, the light-emission control unit 60 may control light emission from the LEDs using pulse width modulation (PWM) control.

Figure 4:
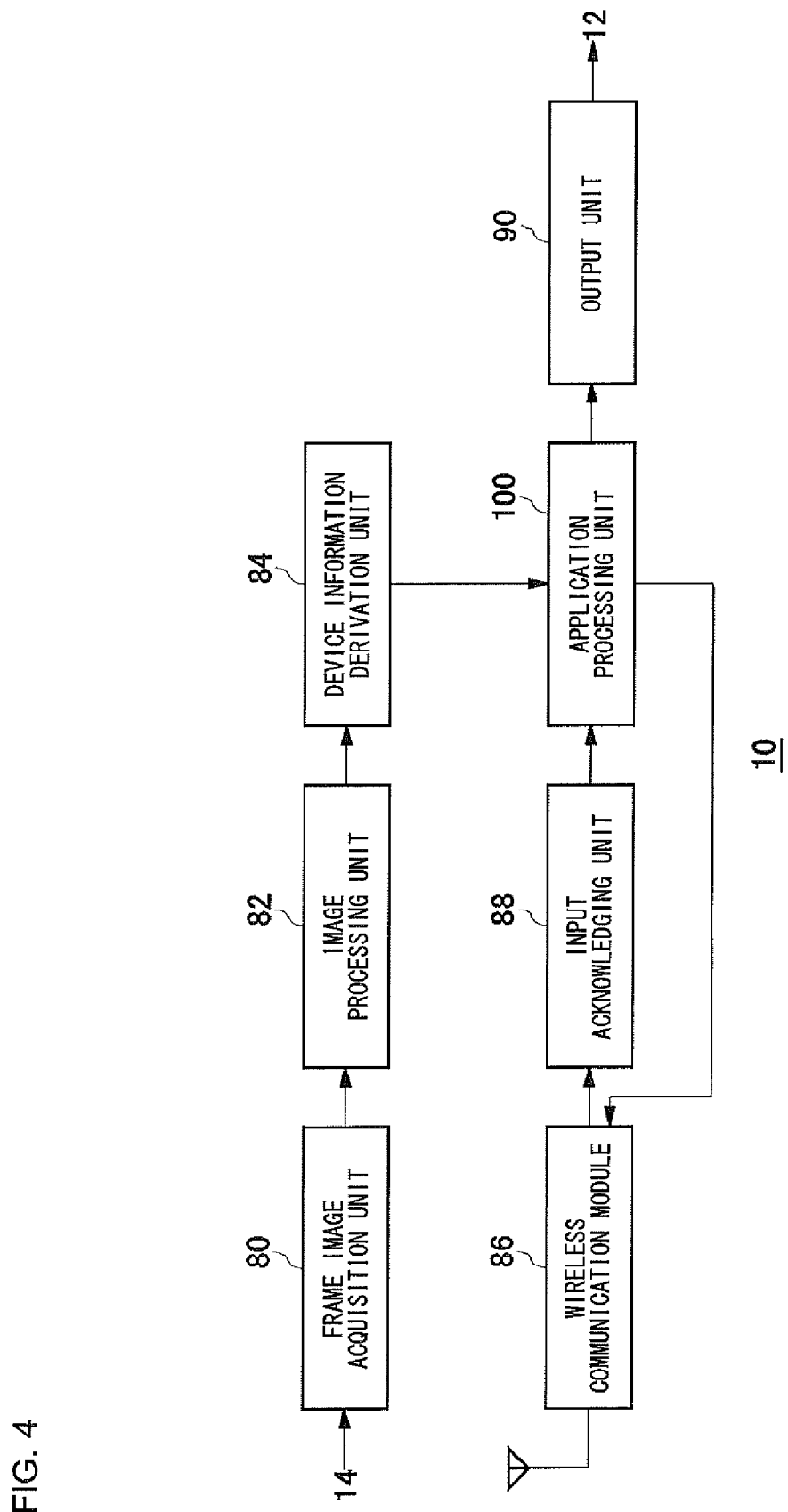
FIG. 4 shows the configuration of the game device.

FIG. 4 shows the configuration of the game device 10. The game device 10 comprises a frame image acquisition unit 80, an image processing unit 82, a device information derivation unit 84, a wireless communication module 86, an input acknowledging unit 88, an output unit 90, and an application processing unit 100. The functions of the game device 10 are implemented by a CPU, a memory, and a program or the like loaded into the memory. FIG. 4 depicts functional blocks implemented by the cooperation of these elements. The program may be built into the game device 10 or supplied from an external source in the form of a recording medium. Therefore, it will be obvious to those skilled in the art that the functional blocks may be implemented in a variety of manners by hardware only, software only, or a combination of thereof. The game device 10 may comprise a plurality of CPUs as required by the hardware configuration.

The wireless communication module 86 established wireless communication with the wireless communication module 48. This allows the input device 20 to transmit information on the status of the control buttons, and information on values detected by the three-axis acceleration sensor 56 and the three-axis gyro sensor 58 to the game device 10 at predetermined intervals.

The wireless communication module 86 receives information on the status of the control buttons and information on values detected by the sensors, which are transmitted by the input device 20, and supplies the information to the input acknowledging unit 88. The input acknowledging unit 88 isolates the button status information from the sensor value information and delivers the information and the value to the application processing unit 100. The application processing unit 100 receives the button status information and the sensor value information as a command to control the game. The application processing unit 100 deals with the sensor value information as the orientation information of the input device 20.

The frame image acquisition unit 80 is configured as a USB interface and acquires frame images at a predetermined imaging speed (e.g., 30 frames/sec) from the imaging device 14. The image processing unit 82 extracts an image of the light-emitting body from the frame image. The image processing unit 82 identifies the position and size of the image of the light-emitting body in the frame image. By causing the light-emitting body 22 of the input device 20 to emit light in a color not likely to be used in the user's environment, the image processing unit 82 can extract the image of the light-emitting body with high precision. The image processing unit 82 may binarize the frame image data using predetermined threshold value and generate a binarized image. Binarization encodes pixel values of pixels having luminance higher than a predetermined threshold value into "1" and encodes pixel values of pixels having luminance equal to or lower than the predetermined threshold value into "0". By lighting the light-emitting body 22 with luminance exceeding the threshold value, the image processing unit 82 can identify the position and size of the image of the light-emitting body from the binarized image. For example, the image processing unit 82 identifies the barycentric coordinates of the image of the light-emitting body in the frame image and identifies the radius of the image of the light-emitting body.

The device information derivation unit 84 derives the positional information of the input device 20 as viewed from the imaging device 14 by referring to the position and size of the image of the light-emitting body identified by the image processing unit 82. The device information derivation unit 84 derives the position coordinates in the camera coordinate system by referring to the barycentric coordinates of the image of the light-emitting body and derives the distance information indicating the distance from the imaging device 14 by referring to the radius of the of the image of the light-emitting body. The position coordinates and the distance information form the positional information of the input device 20. The device information derivation unit 84 derives the positional information of the input device 20 for each frame and delivers the information to the application processing unit 100. The application processing unit 100 deals with the positional information of the input device 20 as a command to control the game.

The application processing unit 100 uses the positional information, orientation information, and button status information of the input device 20 to advance the game, and generates an image signal indicating the result of processing the game application. The image signal is sent from the output unit 90 to the display device 12 and output as a displayed image.

Figure 5:
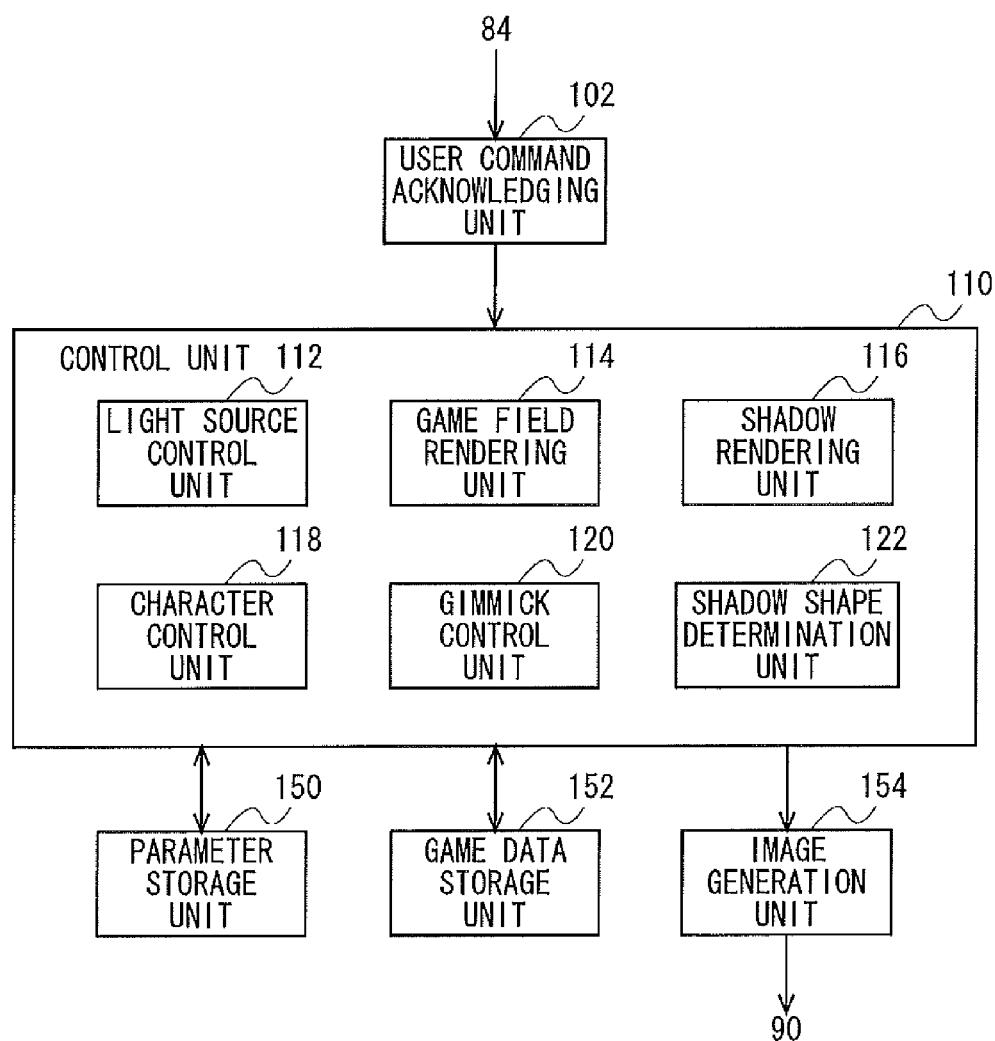
FIG. 5 shows the configuration of the application processing unit.

FIG. 5 shows the configuration of the application processing unit 100. The application processing unit 100 comprises a user command acknowledging unit 102, a control unit 110, a parameter storage unit 150, a game data storage unit 152, and an image generation unit 154.

The user command acknowledging unit 102 acknowledges the positional information of the input device 20 from the device information derivation unit 84 and acknowledges the orientation information and the button state information of the input device 20 from the input acknowledging unit 88 as user commands. The control unit 110 runs the game program and advances the game in accordance with the user command acknowledged by the user command acknowledging unit 102. The parameter storage unit 150 stores parameters necessary for the progress of the game. The game data storage unit 152 stores data necessary for the game such as three-dimensional data for objects forming the game world. The image generation unit 154 generates a display screen by adding necessary information to an image of the game field rendered by the control unit 110.

The control unit 110 includes a light source control unit 112, a game field rendering unit 114, a shadow rendering unit 116, a character control unit 118, a gimmick control unit 120, a shadow shape determination unit 122.

The light control unit 112 controls the position of the light source defined in the game field or the direction of radiation by light emitted from the light source, based on the positional information, orientation information, and button status information of the input device 20. When the control button 40 of the input device 20 is pressed, the light source control unit 112 computes the position of the light source and the direction and angle of radiation, based on the information indicating the current light source position and the direction of radiation stored in the parameter storage unit 150 and on the positional information and orientation information of the input device 20. The light source control unit 112 communicates the position and direction thus computed to the shadow rendering unit 116 and stores the position and direction in the parameter storage unit 150.

The game field rendering unit 114 defines the position of viewpoint and viewing direction for rendering the game field and generates an image of the game field by rendering an object located in the game field and a plane of projection of the shadow. In this embodiment, the wall and the floor constituting the game field are defined as planes of projection.

The shadow rendering unit 116 acquires the position of viewpoint and the viewing direction defined by the game field rendering unit 114 and also acquires the light source position and the direction of radiation defined by the light source control unit 112 so as to render the shadow of the object projected by the light emitted from the light source onto the wall and the floor. The two-dimensional image of the shadow rendered by the shadow rendering unit 116 is stored in the parameter storage unit 150.

The character control unit 118 moves the character along the shadow rendered by the shadow rendering unit 116. The character control unit 118 determines the destination of movement of the character by referring to the two-dimensional image of the shadow rendered by the shadow rendering unit 116. Even if a plurality of objects are located at positions spaced apart from each other, the character control unit 118 determines that the character can move between the shadows of those objects if the shadows of those objects are connected. The character control unit 118 automatically moves the character at a predetermined speed but increases or decreases the speed of moving the character when the unit 118 acquires a control command to increase or decrease the moving speed from the player.

The gimmick control unit 120 controls a gimmick defined in an object located in the game field and designed to invoke a predetermined function. When the character controlled by the character control unit 118 passes by a gimmick located in the field, the gimmick control unit 120 determines whether to invoke the function of the gimmick. When the function should be invoked, the gimmick control unit 120 notifies the character control unit 118, etc. accordingly. The gimmick control unit 120 may determine whether to invoke the function of a gimmick located in the field at a predetermined timing schedule (e.g., for each frame).

The shadow shape determination unit 122 determines whether the shape of the shadow of the object rendered by the shadow rendering unit 116 is a predetermined shape. The shadow shape determination unit 122 compares the two-dimensional image of the shadow rendered by the shadow rendering unit 116 and stored in the parameter storage unit 150 with a predetermined shape stored in the game data storage unit 152, so as to identify the predetermined shape in the two-dimensional image of the shadow. The shadow shape determination unit 122 may determine that a shadow of a predetermined shape has been formed when the position of the light source and the direction of radiation match the predetermined position and direction. When the predetermined shape is detected, the fact is displayed in a distinguishable manner so that the player is notified accordingly. The shadow shape determination unit 122 may determine the shape of the shadow at a predetermined timing schedule (e.g., for each frame). When the gimmick control unit 120 determines whether to invoke the function of the gimmick, the unit 120 may refer to the shadow shape determination unit 122 to determine whether the shape of the shadow of the gimmick is the predetermined shape.

The shadow shape determination unit 122 may present to the user in a stepwise manner that the shadow of the object rendered by the shadow rendering unit 116 approaches the predetermined shape that should be formed. For example, in addition to the predetermined shape that should be formed, a plurality of shapes resembling the predetermined shape in steps may be stored so that, when a shape that matches one of the stored shapes is detected, the player is notified accordingly. Alternatively, shape matching is performed using a known arbitrary technique to search for a predetermined shape from the two-dimensional images of the shadows rendered by the shadow rendering unit 116 so that, when a predetermined matching score or higher is identified, the player is notified accordingly. Still alternatively, the player may be notified when the displacement of the light source position from the predetermined position or the displacement of the direction of radiation from the predetermined direction is below a predetermined value.

Figure 6:
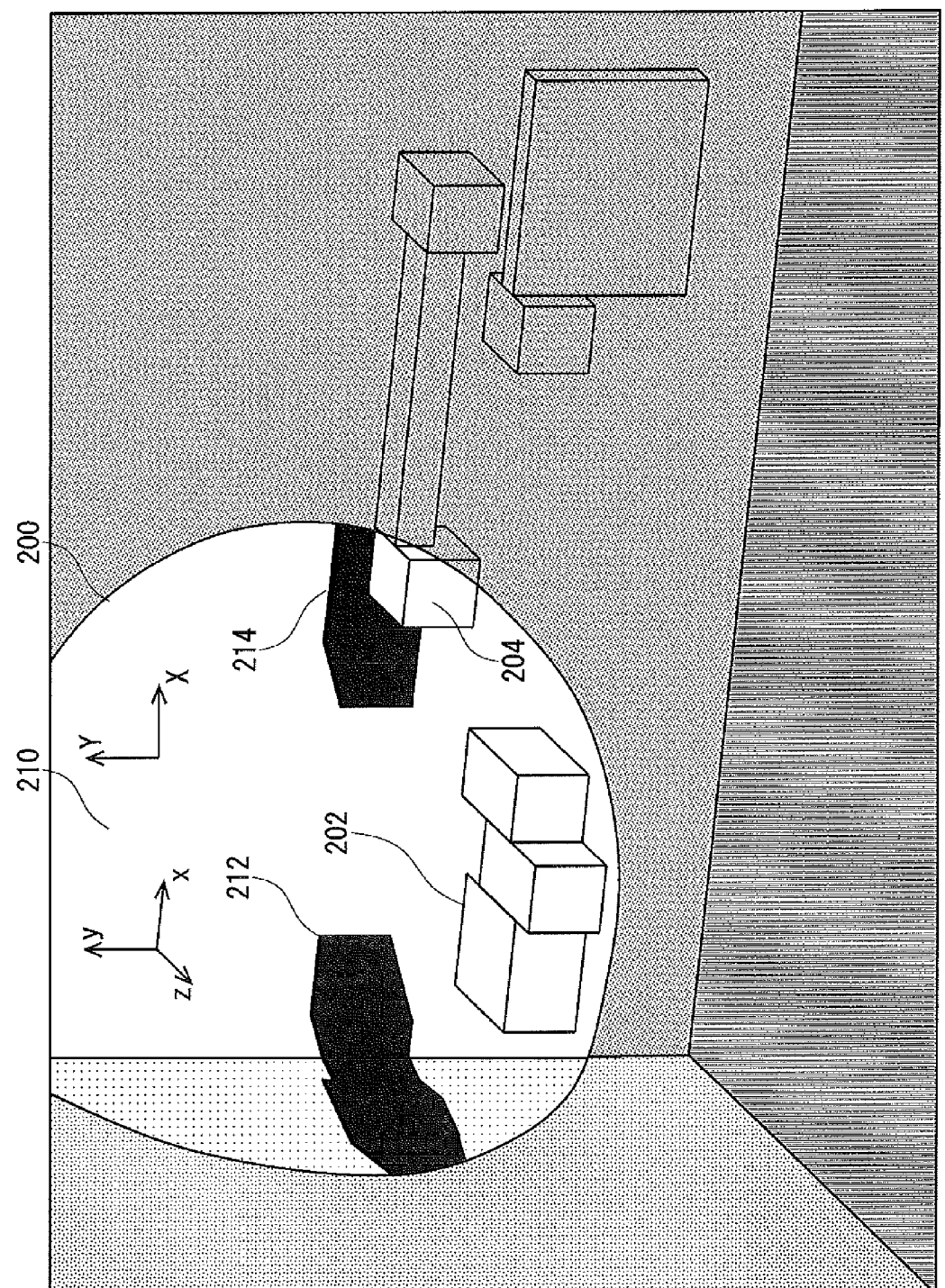
FIG. 6 shows an example of game field in a game controlled by the game device according to the embodiment.

FIG. 6 shows an example of game field in a game controlled by the game device according to the embodiment. A wall 210 constituting the game field and objects 202 and 204 located in the game field are provided in a three-dimensional space. The game field is illuminated by a light source (not shown). The light projects a shadow 212 of the object 202 and a shadow 214 of the object 204 onto the wall 210. In this embodiment, only the shadow projected inside a brightly illuminated area 200 is displayed. The shadow rendering unit 116 also renders the shadow projected outside the area 200. The character control unit 118 ensures that the character can move over the shadow projected outside the area 200.

When the player moves the input device 20 vertically or horizontally while pressing the control button 40 of the input device 20, the light source control unit 112 moves the position of the light source vertically or horizontally or inclines the angle of radiation from the light source vertically or horizontally in accordance with the positional information of the input device 20. When the player inclines the input device 20 vertically or horizontally while pressing the control button 40 of the input device 20, the light source control unit 112 moves the position of the light source vertically or horizontally, or inclines the angle of radiation from the light source vertically or horizontally. The light source control unit 112 may change the position or angle of the light source along the x-axis or y-axis, which define the three-dimensional coordinate system of the game field. Alternatively, the light source control unit 112 may change the position or angle of the light source along the X-axis or Y-axis, which define the two-dimensional coordinate system of the screen in which the game field is rendered. The light source control unit 112 may move the position of the light source in the z-axis direction or the depth direction, of the screen depending on distance between input device 20 and imaging device 14.

Figure 7:
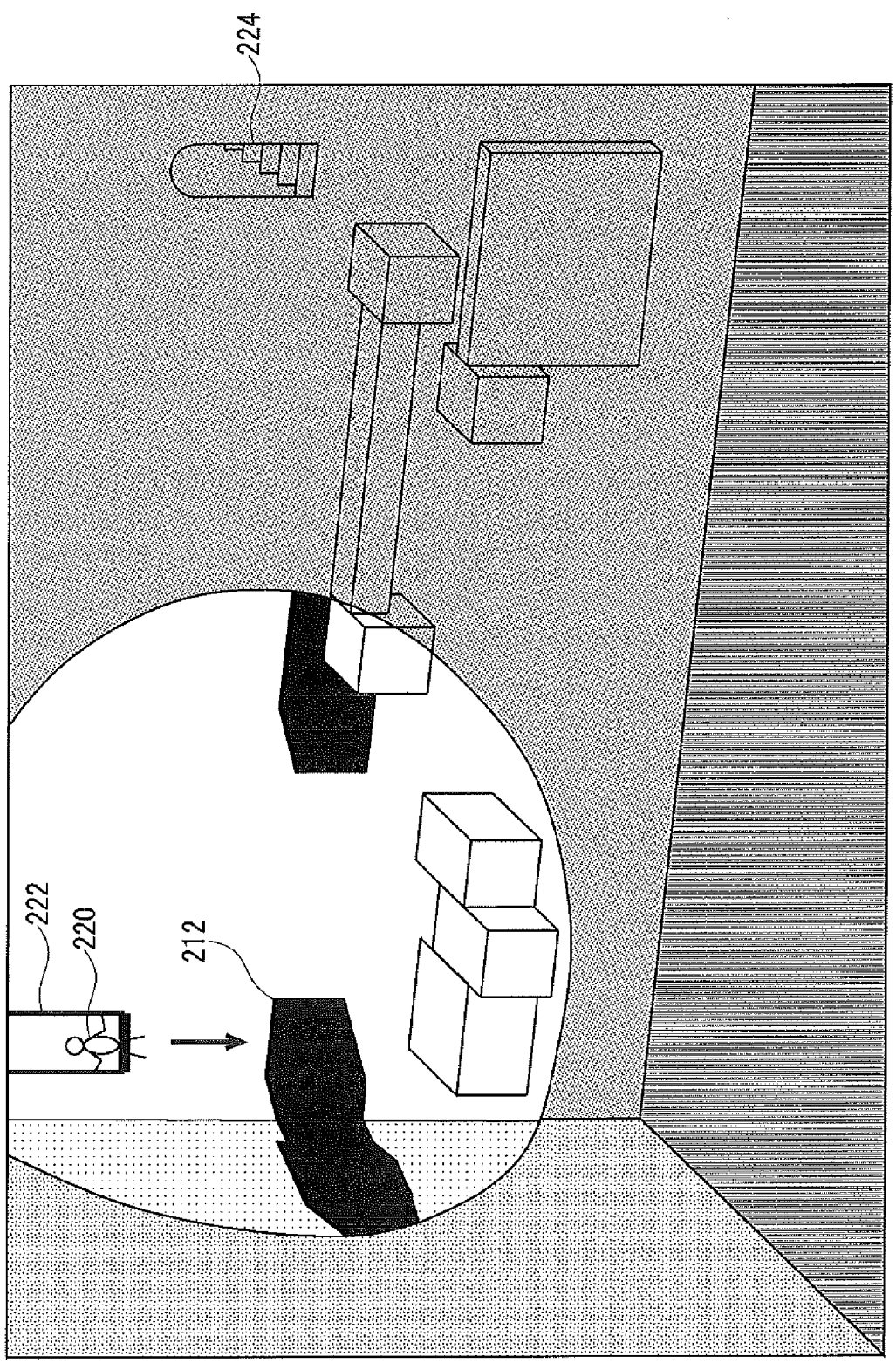
FIG. 7 shows an example of game screen.

FIG. 7 shows an example of game screen. When a game is started, the game field rendering unit 114 acquires the coordinates indicating the initial position of the character from the game data storage unit 152 and displays the character 220 riding a swing 222 at the initial position. In addition, the game field rendering unit 114 acquires the coordinates indicating the position of the goal from game data storage unit 152 and displays a goal 224 in the indicated position. When the player controls the light source and illuminates the character 220 with light, the character control unit 118 causes the character 220 to fall from the swing 222. The character control unit 118 moves the current position of the character 220 downward by a predetermined coordinate value in each frame. Absent a shadow underneath the character 220, the character 220 falls to the bottom end of the screen and the game is over. If there is a shadow underneath the character 220, the character control unit 118 lands the character 220 on the shadow. Therefore, it is necessary for the player to illuminate the character 220 with light by regulating the position and angle of the light source at the start of the game so that the shadow of the object is projected below the character 220.

Figure 8:
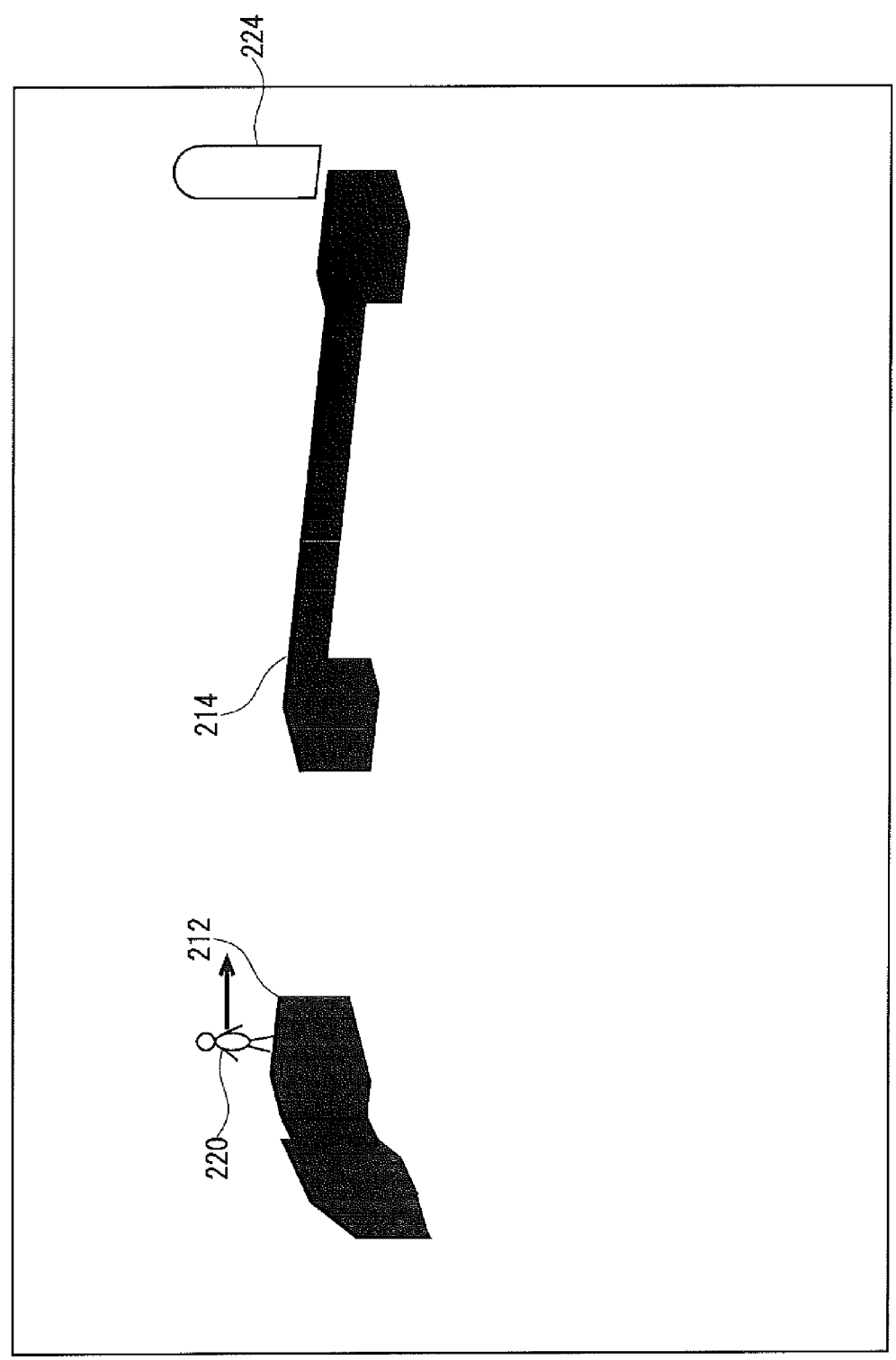
FIG. 8 shows an image of a shadow of an object rendered by the shadow rendering unit.

FIG. 8 shows an image of a shadow of an object rendered by the shadow rendering unit 116. The character control unit 118 refers to the two-dimensional image as illustrated and moves the character 220 along the top of the shadow 212 on which the character 220 lands. Initially, the character control unit 118 moves the character 220 rightward and, when the character 220 reaches the right end of the shadow 212, the unit 118 moves the character 220 leftward. The character control unit 118 moves the character 220 rightward when the character 220 reaches the left end of the shadow 212. The character control unit 118 may move the character 220 leftward at first.

When there is a step difference between shadows, the character control unit 118 may allow the character to go up a step of a predetermined height or less, and prevent the character from going up a higher step causing the character to move in an opposite direction. The character control unit 118 may allow the character to go down a step of a predetermined height or less and prevent the character from going down a higher step, causing the character to move in an opposite direction. Still alternatively, if the gap between the shadow on which the character lands and another shadow adjacent to the shadow on which the character lands is within a predetermined range, the character control unit 118 may allow the character to jump to the adjacent shadow.

If another shadow not continuous with the shadow on which the character lands is located substantially within a height range commensurate with the height of the character in the direction of movement of the character, the character control unit 118 may determine that the character cannot move in that direction because of the shadow as an obstacle and may allow the character to move in an opposite direction.

Because the shadow 212 on which the character 220 lands does not lead to the goal 224 in the state shown in FIG. 8, the character 220 cannot arrive at the goal 224. The player leads the character 220 to the goal 224 by adjusting the position and angle of the light source so that the shadow 212, the shadow 214, and the goal 224 are connected.

Figure 9:
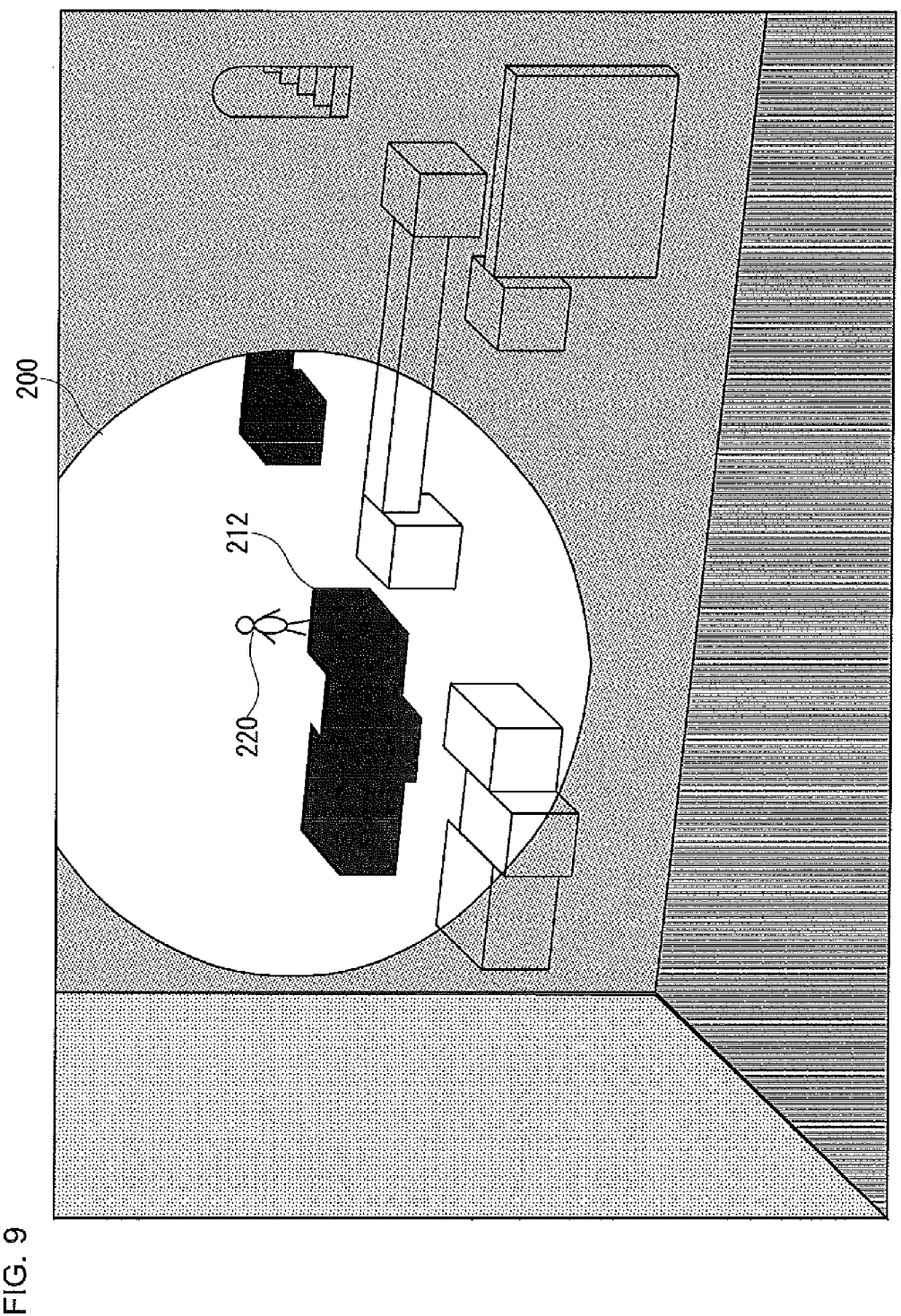
FIG. 9 shows an example of game screen.

FIG. 9 shows an example of game screen. When the player moves the position of the light source leftward using the input device or moves the direction of radiation by light rightward, the position of the shadow of the object is moved to the right. When light source control unit 112 changes the light source position or the direction of radiation, the shadow rendering unit 116 sets a light source position and a direction of radiation for each frame, and renders the shadow of the object projected onto the wall and the floor. While the light source control unit 112 is changing the position or angle of the light source, the character control unit 118 does not allow the character to move and causes the character 220 to remain still on the spot. In association with the movement of the shadow 212 rendered by the shadow rendering unit 116, the character 220 is also moved. Therefore, the character 220 remains riding the shadow 212 and moves rightward along with the shadow 212. When the character collides an obstacle such as another shadow while moving in association with the movement of the shadow, the character control unit 118 moves the character as if the character is pushed by the obstacle. When the character leaves the block of the shadow on which the character lands as a result of the character being moved by the obstacle, the character control unit 118 causes the character to fall downward from the position.

Figure 10:
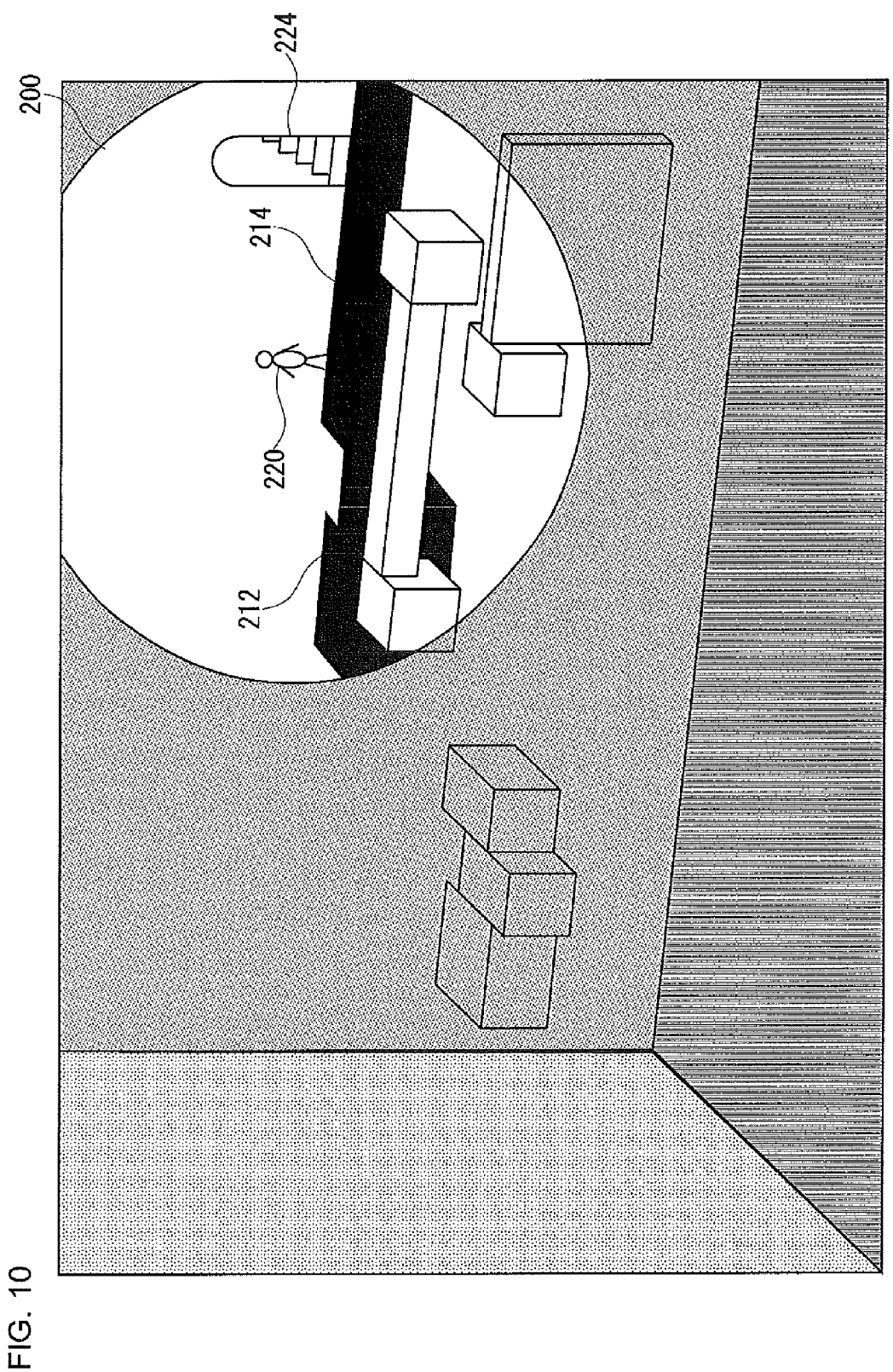
FIG. 10 shows an example of game screen.

FIG. 10 shows an example of game screen. When the player moves the light source position further leftward or moves the direction of radiation further rightward, the shadow of the object moves further rightward so that the shadow 212 of the object 202, the shadow 214 of the object 204, and the goal 224 are blended. When the light source position and the direction of radiation are fixed in this state, the character control unit 118 moves the character 220 to reach the goal 224 and the game is cleared.

The operation of the light source control unit 112 and the character control unit 118 will be described in further detail. When the light source control unit 112 changes the light source position or direction of radiation, the shadow rendering unit 116 defines the position of viewpoint and viewing direction of the camera and defines the light source position and the direction of radiation and renders the shadow of the object, using the wall and the floor in the game field as a plane of projection. The shadow rendering unit 116 computes the two-dimensional coordinates of those positions rendered as forming a shadow in the game screen and stores the coordinates in the parameter storage unit 150. In this process, the shadow rendering unit 116 may store only the two-dimensional coordinates of the top end of the block of shadow in the parameter storage unit 150. The light source control unit 112 identifies the correspondence between the shadow positions occurring before and after the light source position or direction of radiation is changed. The light source control unit 112 notifies the character control unit 118 of the post-change coordinates corresponding to the coordinates of the shadow on which the character landed before the change. When a gimmick is located in the game field, the light source control unit 112 stores the type of the gimmick and the coordinates of the shadow of the gimmick in the parameter storage unit 150.

While the light source control unit 112 is changing the light source position or direction of radiation, the character control unit 118 does not allow the character to move automatically and causes the character 220 to remain still on the spot. In association with the movement of the shadow 212 on which the character lands, the character control unit 118 moves the character to the coordinates after the change communicated from the light source control unit 112. The character control unit 118 may control the character such that the character is stopped if the speed in which the light source control unit 112 changes the light source position or the direction of radiation is equal to or more than a predetermined speed and the character is not stopped if the speed is lower than the predetermined speed. If the character is not in contact with the shadow due to, for example, a jump or fall, the character control unit 118 may not stop the character and allow the character to move automatically even while the light source control unit 112 is changing the light source position or the direction of radiation. While the light source control unit 112 is not changing the light source position or direction of radiation, the character control unit 118 determines the position to which the character is moved by referring to the two-dimensional image of the shadow stored in the parameter storage unit 150 and updates the two-dimensional coordinates of the character in the game screen accordingly.

Figure 11:
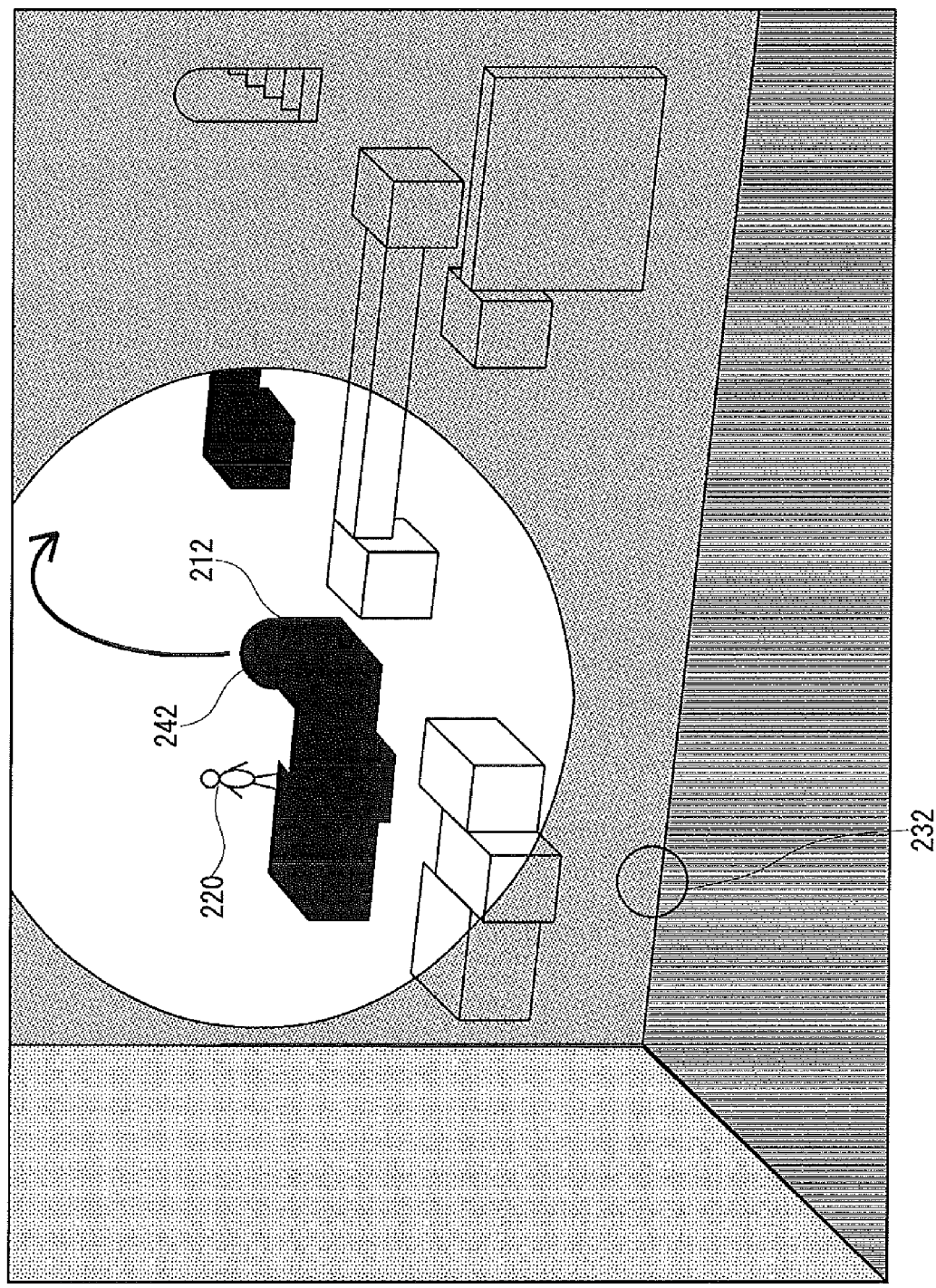
FIG. 11 shows an example of game screen in which a gimmick having the function of causing a character to jump is located.

A description will now be given of a gimmick located in the game field. FIG. 11 shows an example of game screen in which a gimmick having the function of causing a character to jump is located. A spherical object 232 is a gimmick having the function of causing a character to jump. When the character 220 moves over a shadow 242 of the object 232 while the shadow 242 overlaps the shadow 212 on which the character 220 lands, the function of the gimmick is invoked so that the character 220 jumps upward.

Figure 12:
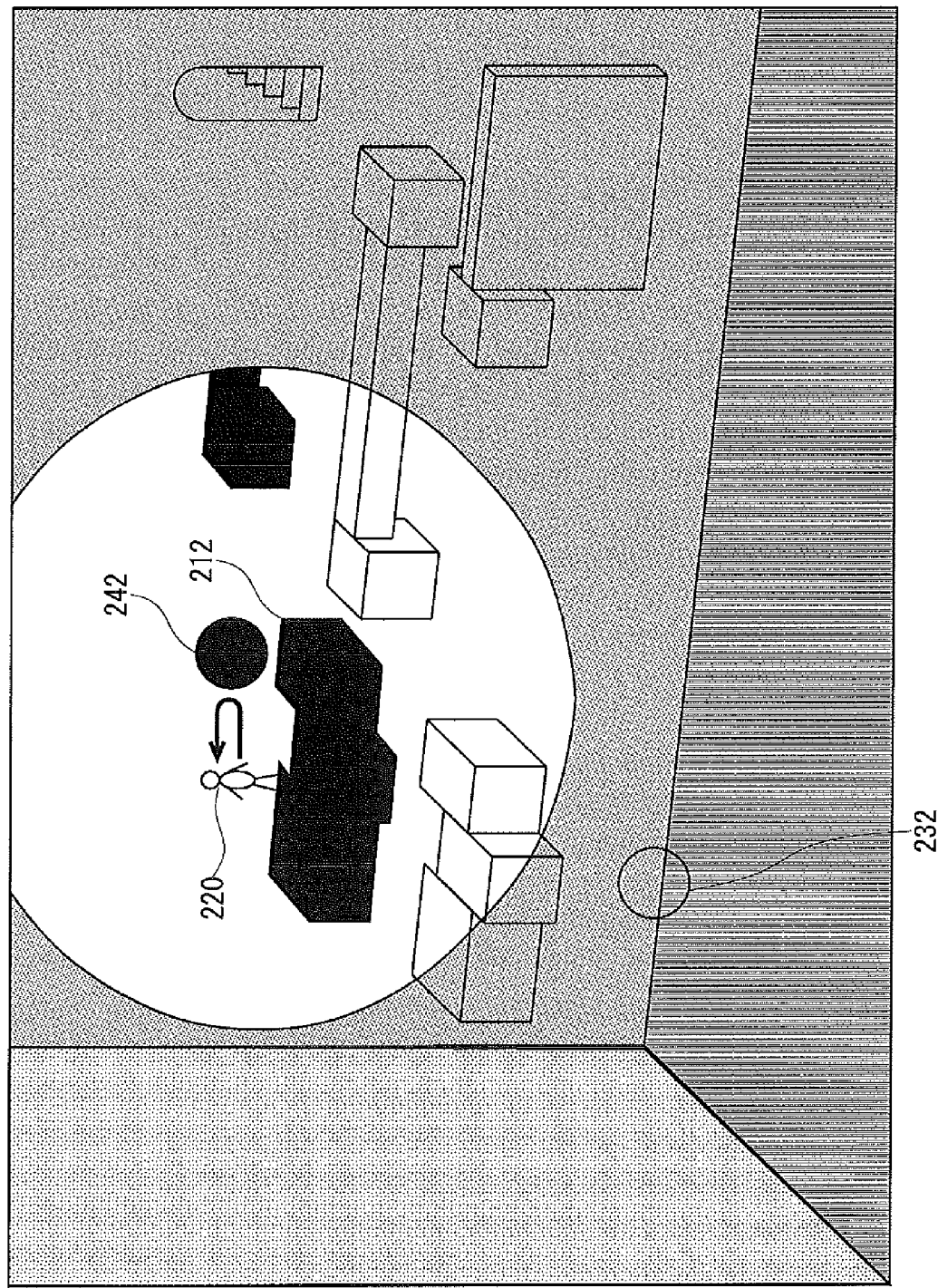
FIG. 12 shows an example of game screen in which a gimmick having the function of causing a character to jump is located.

FIG. 12 shows an example of game screen in which a gimmick having the function of causing a character to jump is located. While the shadow 242 of the object 232 does not overlap the shadow 212 on which the character 220 lands, the shadow 242 does not function as a gimmick to cause the character 220 to jump and represents an obstacle that blocks the movement of the character 220.

In rendering the shadows of objects, the shadow rendering unit 116 stores the shadow of an ordinary object and that of a gimmick in the parameter storage unit 150 in a distinguishable manner. A flag indicating whether the shadow is that of a gimmick or not may be recorded in each dot of the two-dimensional plane in which shadows are rendered. Alternatively, the coordinates of the shadow of a gimmick may be maintained in a table. When moving the character, the character control unit 118 refers to the parameter storage unit 150 so as to determine whether the shadow on which the character lands is that of a gimmick. If the shadow on which the character lands is that of a gimmick, the character control unit 118 notifies the gimmick control unit 120 accordingly.

The gimmick control unit 120 refers to the two-dimensional image of the shadow rendered by the shadow rendering unit 116 to identify the state of the shadow of the gimmick on which the character lands. If the shadow of the gimmick is in a predetermined state, the gimmick control unit 120 invokes the function of the gimmick. If not, the function is not invoked. The gimmick control unit 120 examines the two-dimensional images of shadows and refers to the state of the shadows around the shadow of the object provided with a gimmick and determines whether to invoke the function of the gimmick. In the case of a gimmick having the function of causing a character to jump as shown in FIGS. 11 and 12, the function of the gimmick is invoked if the shadow of the gimmick overlaps the shadow on which the character landed immediately before. If not, the function is not invoked.

Figure 13:
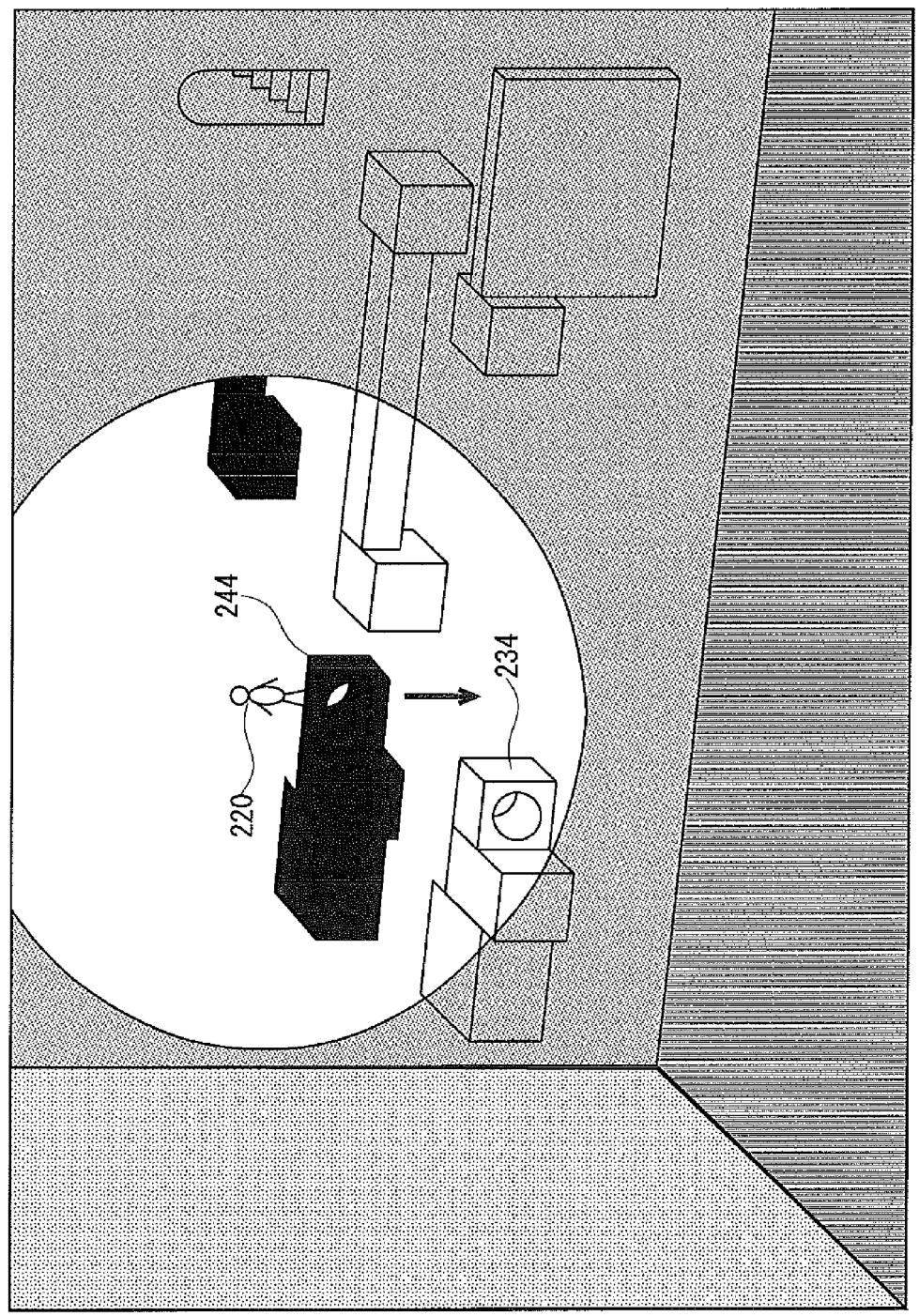
FIG. 13 shows an example of game screen in which a gimmick provided with the function of causing a character to fall is located.

FIG. 13 shows an example of game screen in which a gimmick provided with the function of causing a character to fall is located. An object 234 having a hollow is a gimmick having the function of causing a character to fall. If there is a hole in a shadow 244 of the object 234, the function of the gimmick is invoked as the character moves over the shadow 244 so that the character 220 falls below the shadow 244.

Figure 14:
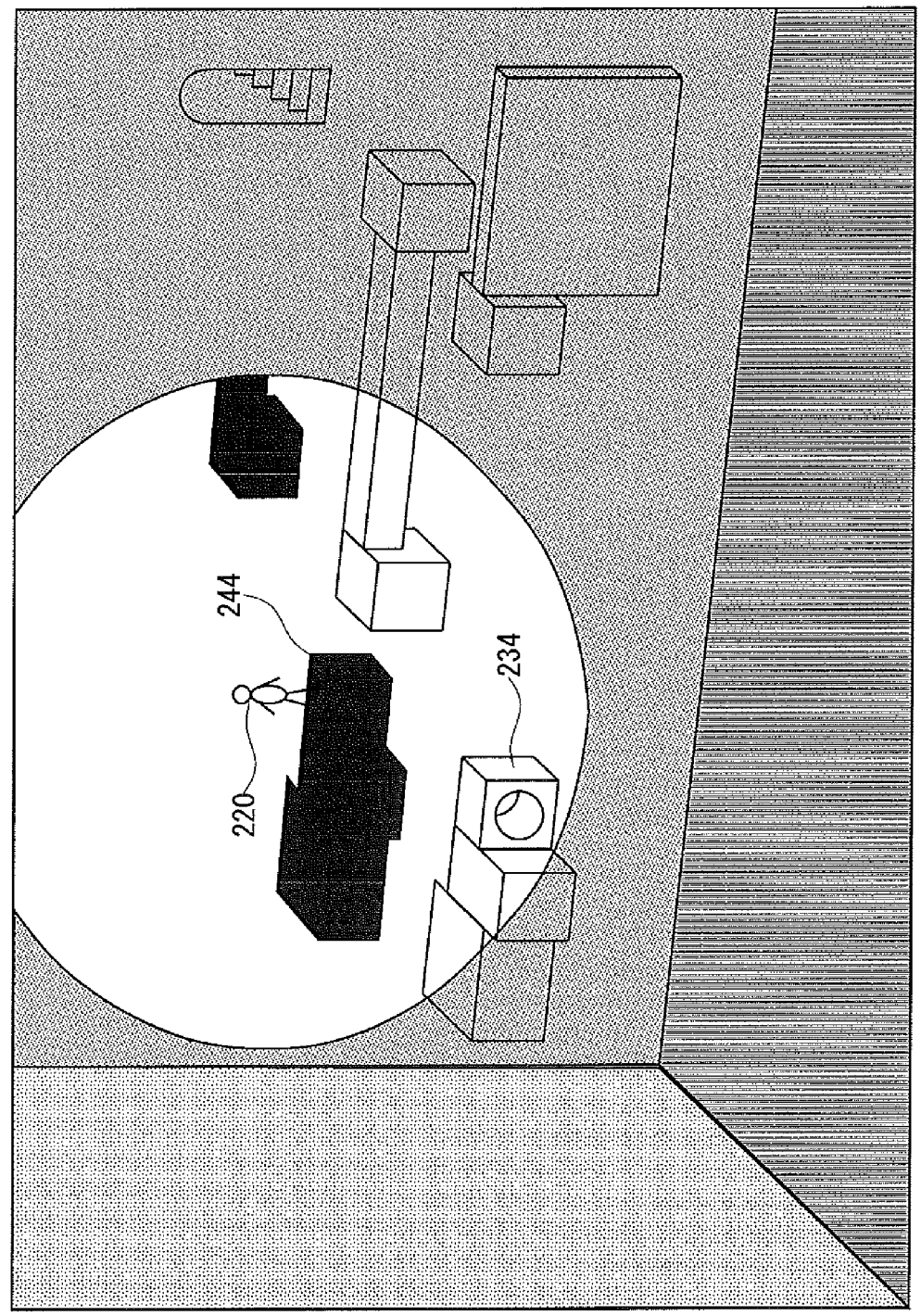
FIG. 14 shows an example of game screen in which a gimmick provided with the function of causing a character to fall is located.

FIG. 14 shows an example of game screen in which a gimmick provided with the function of causing a character to fall is located. If the object 234 is illuminated from the light source position and in the direction of radiation that do not project a hollow so that a hole is not created in the shadow 244 of the object 234, the shadow 244 does not function as a gimmick to cause the character 220 to fall so that the character 220 can pass over the shadow 244.

The gimmick control unit 120 refers to the two-dimensional image of the shadow rendered by the shadow rendering unit 116 to see whether a hole derived from the hollow in the object 234 is created below the current position of the character. If a hole is created, the gimmick control unit 120 invokes the function of the gimmick. If not, the gimmick control unit 120 does not invoke the function of the gimmick.

Figure 15A:
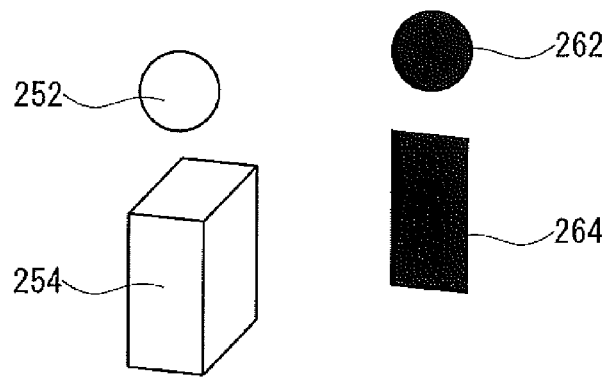
FIG. 15 illustrates the function of determining that a goal is formed.
Figure 15B:
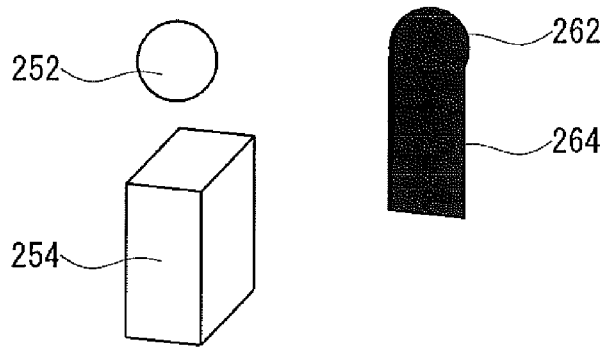
Figure 15C:
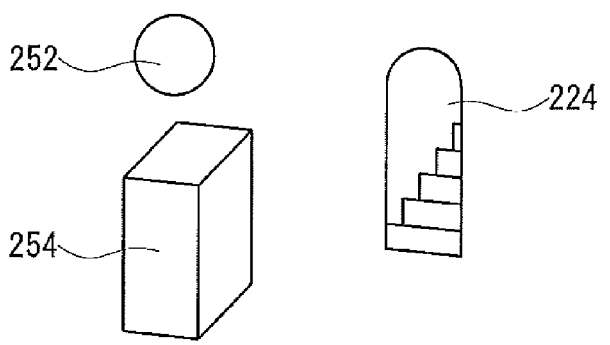

A description will now be given of the function of the shadow shape determination unit 122. FIG. 15 illustrates the function of determining that a goal is formed. FIG. 15A shows a shadow 262 of a spherical object 252 and a shadow 264 of a rectangular solid object 254. FIG. 15B shows the shadow 262 of the spherical object 252 and the shadow 264 of the rectangular solid object 254 overlap. When the shadow shape determination unit 122 detects a shadow of a shape shown in FIG. 15B in the two-dimensional image of the shadow rendered by the shadow rendering unit 116, the shadow shape determination unit 122 determines that a goal is formed. When the shadow shape determination unit 122 determines that a goal is formed, the unit 122 notifies the shadow rendering unit 116 accordingly. As shown in FIG. 15C, the shadow rendering unit 116 changes the shadows 262 and 264 into an image representing the goal 224. This notifies the player that the goal 224 is formed.

Figure 16A:
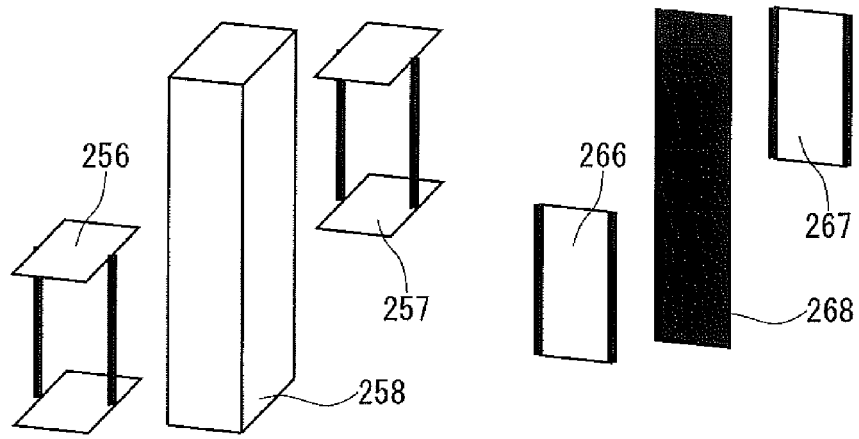
FIG. 16 illustrates the function of determining that a tunnel is formed.
Figure 16B:
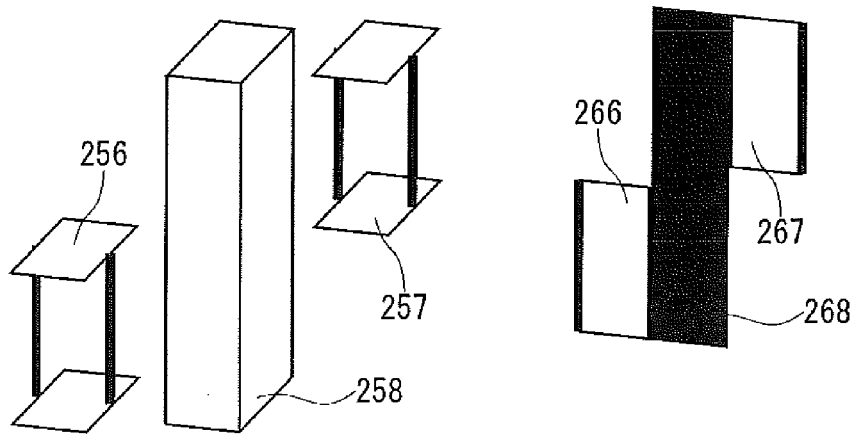

FIG. 16 illustrates the function of determining that a tunnel is formed. FIG. 16A shows a shadow 266 of an object 256 of a shape of a gate, a shadow 267 of another object 257 of a shape of a gate, and a shadow 268 of an object 258 of a shape of a square pole. FIG. 16B shows that the shadow 266 of the gate 256 and the shadow 268 of the pole 258 are contiguous and that the shadow 267 of the gate 257 and the shadow 268 of the pole 258 are contiguous. When the shadow shape determination unit 122 detects a shadow of a shape shown in FIG. 16B in the two-dimensional image of the shadow rendered by the shadow rendering unit 116, the shadow shape determination unit 122 determines that a tunnel is formed. When the shadow shape determination unit 122 determines that a tunnel is formed, the unit 122 notifies the character control unit 118 accordingly.

Figure 16C:
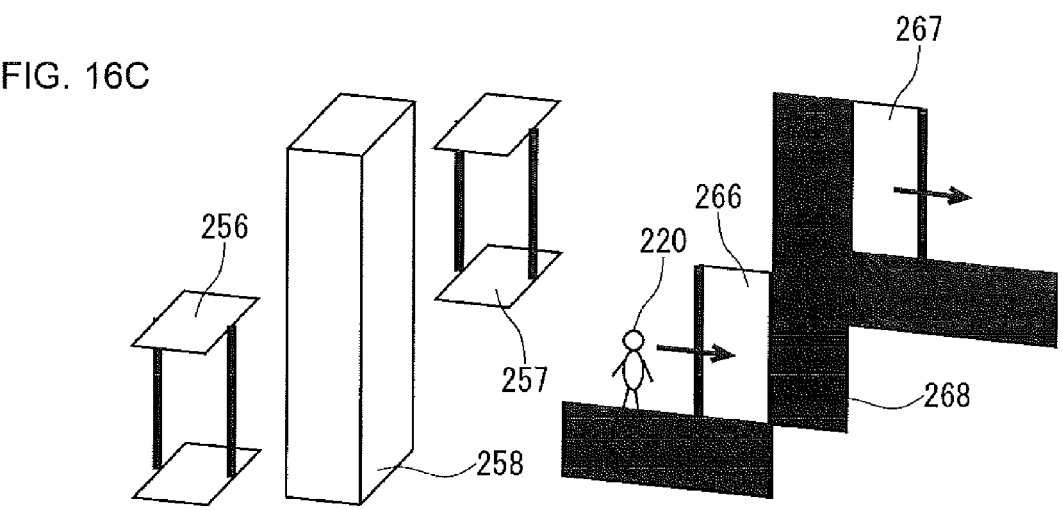

When the character 220 passes through the shadow 266 of the gate 256 as shown in FIG. 16C, the character control unit 118 moves the character 220 toward the shadow 267 of the gate 257 as if the character goes through the shadow 268 of the pole 258. If the shadow 268 of the pole 258 is not contiguous with the shadow of another gate when the character 220 passes through the shadow 267 of the gate 257, the character control unit 118 moves the character 220 to exit from the shadow 267 of the gate 257.

When there are two or more shadows of gates contiguous with the shadow of a pole, the character control unit 118 calculates the distance from the position of the shadow of the gate that the character passes through to the shadows of other gates and moves the character toward the shadow of the closest gate. If there are a plurality of closest gates with shadows, the character control unit 118 may move the character to the shadow of the uppermost gate or to the shadow of the leftmost gate. Alternatively, the priority may be determined according to an arbitrary rule. If the light source position or the direction of radiation is changed by the light source control unit 112 while the character advances into a tunnel from the shadow of a gate and has not left the shadow of another gate, causing the tunnel to be disjoined, the character control unit 118 may allow the character to escape from the shadow of any of the gates connected to the tunnel or cause the game to be over.

Figure 17:
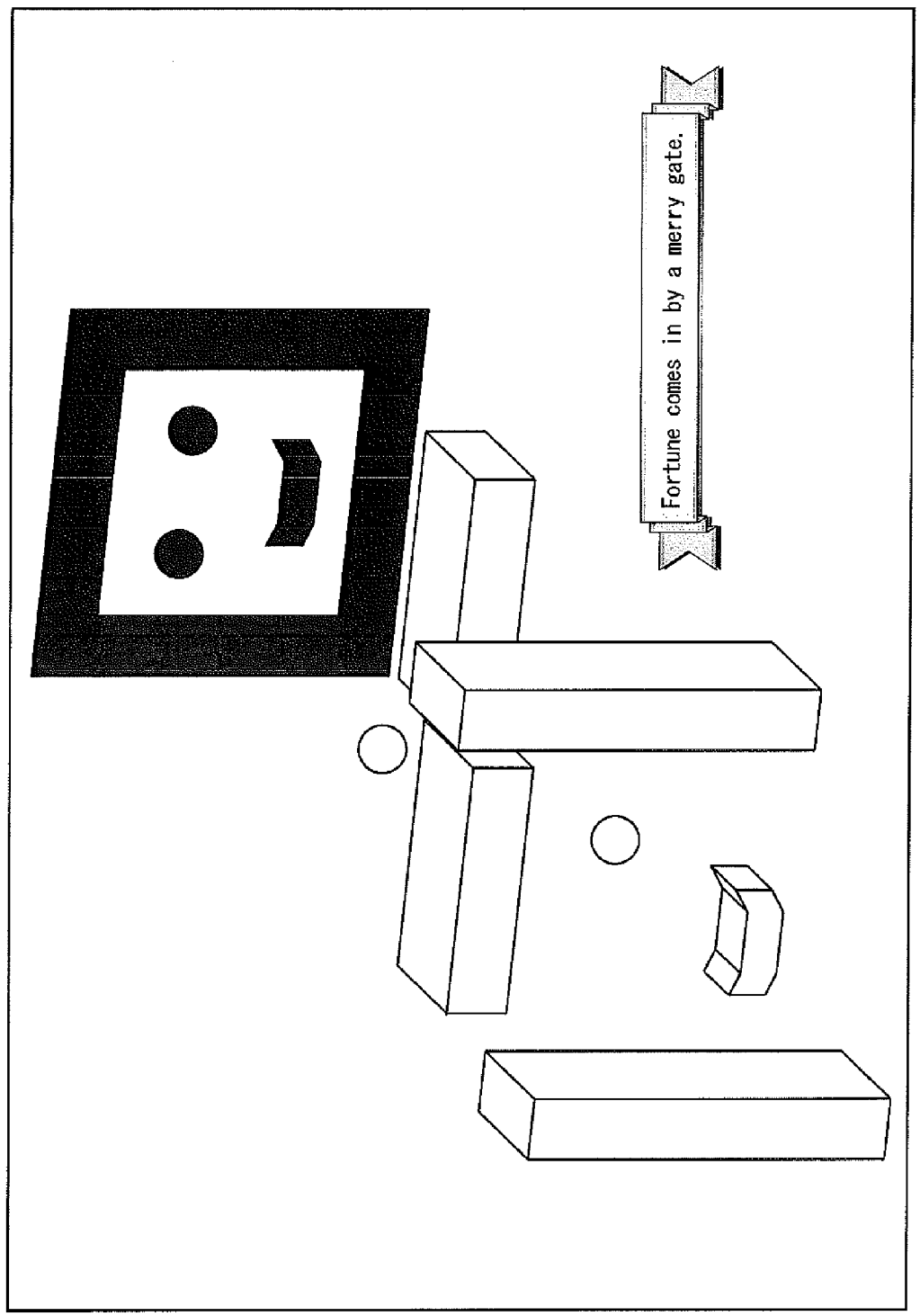
FIG. 17 illustrates the function of determining that a shadow picture is formed.

FIG. 17 illustrates the function of determining that a shadow picture is formed. In the illustrated example, objects are located so that a shadow of a predefined shape is formed when the objects are illuminated from a predetermined light source position and in a predetermined direction. The player changes the light source position or direction of radiation so that a hidden shadow picture is formed, using a message as a hint. When the shadow shape determination unit 122 determines that a shadow of a predefined shape is formed, the unit 122 notifies the player accordingly. The shadow shape determination unit 122 may detect a predefined shape by referring to the two-dimensional image of the shadow rendered by the shadow rendering unit 116. Alternatively, the shadow shape determination unit 122 may determine whether the light source position and the direction of radiation changed by the light source control unit 112 match the predefined position and direction. A passage guiding the character to a goal may be formed when a shadow of a predefined shape is formed.

Described above is an explanation based on an exemplary embodiment. The embodiment is intended to be illustrative only and it will be obvious to those skilled in the art that various modifications to constituting elements and processes could be developed and that such modifications are also within the scope of the present invention.

DESCRIPTION OF THE REFERENCE NUMERALS 1 game system, 10 game device, 110 control unit, 112 light source control unit, 114 game field rendering unit, 116 shadow rendering unit, 118 character control unit, 120 gimmick control unit, 122 shadow shape determination unit, 150 parameter storage unit, 152 game data storage unit, 154 image generation unit The present invention is applicable to a game device for controlling a game in which a character is moved along a shadow of an object located in a three-dimensional space.

The invention claimed is:

1. A non-transitory, computer readable recording medium containing a game control program, which when executed by a microprocessor of a game console having at least a display and a game controller causes the game console to implement the following:
   a module configured to change, in a game field displayed on the display in which an object is located, a position of a light source or a direction of radiation by light emitted from the light source based on a control command of a player through the game controller;
   a module configured to render a shadow of the object projected by the light emitted from the light source onto a plane of projection defined in the game field; and
   a module configured to move a character along the shadow of the object and to automatically stop the character while the module configured to change is changing the position of the light source or direction of radiation by light emitted from the light source,
   wherein the module to move the character stops the character if a speed, at which the module to change the position of the light source or the direction of radiation by light emitted from the light source changes the position or direction, is a non-zero predetermined speed or higher, and, if the speed is less than the predetermined speed, the module to move the character does not stop the character.

2. The game control program according to claim 1, wherein the module to move the character allows the character to move between shadows of a plurality of objects located at positions spaced apart from each other if the shadows of the objects are contiguous with each other.

3. The game control program according to claim 1, wherein the module to move the character refers to a two-dimensional image of the shadow of the object rendered by the module to render the shadow so as to determine a destination of movement of the character.

4. The game control program according to one of claim 1, wherein the module to move the character does not stop the character even while the module to change the position of the light source or the direction of radiation by light emitted from the light source is changing the position or direction, if the character is not in contact with the shadow.

5. A game device comprising:
   a game console having a game controller, a microprocessor and a non-transitory, computer readable recording medium containing a game control program, which when executed by the microprocessor causes the game console to implement the following:
   a light control unit configured to change, in a game field displayed on the display in which an object is located, a position of a light source or a direction of radiation by light emitted from the light source based on a control command of a player through the game controller;
   a shadow rendering unit configured to render a shadow of the object projected onto a plane of projection defined in the game field; and
   a character control unit configured to move a character along the shadow of the object, and to automatically stop the character while the light control unit is changing the position of the light source or direction of radiation by light emitted from the light source,
   wherein the character control unit stops the character if a speed, at which the a light control unit changes the position of the light source or the direction of radiation by light emitted from the light source changes the position or direction, is a non-zero predetermined speed or higher, and, if the speed is less than the predetermined speed, the character control unit does not stop the character.

6. A game control method carried out by a game console having a game controller, a microprocessor and a non-transitory, computer readable recording medium containing a game control program, which when executed by the microprocessor causes the game console to implement steps comprising:
   changing, in a game field displayed on the display in which an object is located, a position of a light source or a direction of radiation by light emitted from the light source based on a control command of a player through the game controller;
   rendering a shadow of the object projected onto a plane of projection defined in the game field; and
   moving a character along the shadow of the object and automatically stopping the character while the step of changing is changing the position of the light source or direction of radiation by light emitted from the light source,
   wherein the step of moving the character includes stopping the character if a speed, at which the change in the position of the light source or the change in the direction of radiation by light emitted from the light source, is a non-zero predetermined speed or higher, and, if the speed is less than the predetermined speed, the step of moving the character does not include stopping the character.

7. A non-transitory, computer readable recording medium containing a game control program, which when executed by a microprocessor of a game console having at least a display and a game controller causes the game console to implement the following:

a module configured to change, in a game field displayed on the display in which an object is located, a position of a light source or a direction of radiation by light emitted from the light source based on a control command of a player through the game controller;

a module configured to render a shadow of the object projected by the light emitted from the light source onto a plane of projection defined in the game field;

a module configured to determine whether a predetermined shape that should be formed by the shadow of the object is formed;

a module configured to invoke a predetermined function corresponding to the shadow of the predetermined shape when it is determined that the shadow of the predetermined shape is formed; and a module configured to move a character along the shadow of the object, wherein:

the predetermined function includes permitting a player character to move on or by the shadow of the object and to achieve an additional action when the shadow of the object achieves the predetermined shape;

at least two shadows are combined to produce the predetermined shape;

the module configured for determination determines whether a shape of a tunnel that the character can pass through is formed as a result of shadows of a plurality of tunnel gate objects being connected, and when it is determined that the shape of the tunnel is formed, the module configured to invoke the function moves, when the character passes through one of the tunnel gates, the character to a position of another tunnel gate.

8. The game control program according to claim 7, wherein the module configured for determination refers to a two-dimensional image of the shadow of the object rendered by the module to render the shadow so as to determine whether the shadow of the predetermined shape is formed.

9. The game control program according to claim 7, wherein the module configured for determination refers to the position of the light source and the direction of radiation so as to determine whether the shadow of the predetermined shape is formed.

10. The game control program according to one of claim 7, wherein, when the shadow of the object approaches the predetermined shape, the module configured for determination presents the fact to the player.

11. The game control program according to one of claim 7, further comprising:

a module configured to move a character along the shadow of the object, wherein the module configured for determination determines whether a shape of a goal to which the character should be guided is formed by the shadow of the object, and when it is determined that the shape of the goal is formed, the module configured to invoke the function presents to the player the fact that the goal is formed, and, when the character reaches the goal, the module configured to invoke the function determines that a purpose of the game is achieved.

12. The game control program according to one of claim 7, further comprising a module configured to present a message related to the predetermined shape to the player.

13. A game device comprising:

a game console having a game controller, a microprocessor and a non-transitory, computer readable recording medium containing a game control program, which when executed by the microprocessor causes the game console to implement the following:

a light control unit configured to change, in a game field displayed on the display in which an object is located, a position of a light source or a direction of radiation by light emitted from the light source based on a control command of a player through the game controller;

a shadow rendering unit configured to render a shadow of the object projected onto a plane of projection defined in the game field;

a shadow shape determination unit configured to determine whether a predetermined shape that should be formed by the shadow of the object is formed, wherein, when it is determined that a shadow of the predetermined shape is formed, the shadow shape determination unit invokes a predetermined function corresponding to the shadow of the predetermined shape; and a character control unit configured to move a character along the shadow of the object, wherein:

the predetermined function includes permitting a player character to move on or by the shadow of the object and to achieve an additional action when the shadow of the object achieves the predetermined shape;

at least two shadows are combined to produce the predetermined shape, the shadow shape determination unit determines whether a shape of a tunnel that the character can pass through is formed as a result of shadows of a plurality of tunnel gate objects being connected, and when it is determined that the shape of the tunnel is formed, the a character control unit moves, when the character passes through one of the tunnel gates, the character to a position of another tunnel gate.

14. A game control method carried out by a game console having a game controller, a microprocessor and a non-transitory, computer readable recording medium containing a game control program, which when executed by the microprocessor causes the game console to implement steps comprising:

changing, in a game field displayed on the display in which an object is located, a position of a light source or a direction of radiation by light emitted from the light source based on a control command of a player through the game controller;

rendering a shadow of the object projected onto a plane of projection defined in the game field;

determining whether a predetermined shape that should be formed by the shadow of the object is formed;

invoking, when it is determined that a shadow of the predetermined shape is formed, a predetermined function corresponding to the shadow of the predetermined shape; and moving a character along the shadow of the object, wherein:

the predetermined function includes permitting a player character to move on or by the shadow of the object and to achieve an additional action when the shadow of the object achieves the predetermined shape;

at least two shadows are combined to produce the predetermined shape, the step of determining includes determines whether a shape of a tunnel that the character can pass through is formed as a result of shadows of a plurality of tunnel gate objects being connected, and when it is determined that the shape of the tunnel is formed, the step of moving the character includes moving, when the character passes through one of the tunnel gates, the character to a position of another tunnel gate.

15. A non-transitory, computer readable recording medium containing a game control program, which when executed by a microprocessor of a game console having at least a display and a game controller causes the game console to implement the following:
- a module configured to change, in a game field displayed on the display in which an object is located, a position of a light source or a direction of radiation by light emitted from the light source based on a control command of a player through the game controller;
- a module configured to render a shadow of the object projected by the light emitted from the light source onto a plane of projection defined in the game field;
- a module configured to move a character along the shadow of the object;
- a module configured to control a gimmick provided in the object and having a predetermined function; and
- a module configured to invoke the function provided in the gimmick if the shadow of the object provided with the gimmick is in a predetermined state when the character moves near the shadow of the object provided with the gimmick, and not to invoke the function if the shadow is not in the predetermined state, wherein:
- the function is invoked when the shadow of the object provided with the gimmick is in a predetermined shape; and at least two shadows are combined to produce the predetermined shape,
- the gimmick has a function of causing the character to fall,
- the object provided with the gimmick has a through hole, and
- when the shadow of the object provided with the gimmick is provided with a hole derived from the through hole, the module configured to invoke the function invokes the function provided in the gimmick.

16. The game control program according to claim 15, wherein the module to invoke the function refers to a two-dimensional image of the shadow of the object rendered by the module to render the shadow so as to determine whether to invoke the function provided in the gimmick.

17. The game control program according to claim 16, wherein the module to invoke the function refers to a state around the shadow of the object provided with the gimmick in the two-dimensional image of the shadow of the object and determines whether to invoke the function provided in the gimmick.

18. The game control program according to claim 15,
- wherein the gimmick has a function of causing the character to jump, and
- when the shadow of the object provided with the gimmick overlaps a shadow in contact with the character, the module to invoke the function invokes the function provided in the gimmick.

19. A game device comprising:
- a game console having a game controller, a microprocessor and a non-transitory, computer readable recording medium containing a game control program, which when executed by the microprocessor causes the game console to implement the following:
- a light control unit configured to change, in a game field displayed on the display in which an object is located, a position of a light source or a direction of radiation by light emitted from the light source based on a control command of a player through the game controller;
- a shadow rendering unit configured to render a shadow of the object projected onto a plane of projection defined in the game field;
- a character control unit configured to move a character along the shadow of the object; and
- a gimmick control unit configured to control a gimmick provided in the object and having a predetermined function,
- wherein the gimmick control unit invokes the function provided in the gimmick if the shadow of the object provided with the gimmick is in a predetermined state when the character moves near the shadow of the object provided with the gimmick, and does not invoke the function if the shadow is not in the predetermined state, wherein:
- the function is invoked when the shadow of the object provided with the gimmick is in a predetermined shape; and at least two shadows are combined to produce the predetermined shape,
- the gimmick has a function of causing the character to fall,
- the object provided with the gimmick has a through hole, and
- when the shadow of the object provided with the gimmick is provided with a hole derived from the through hole, the module configured to invoke the function invokes the function provided in the gimmick.

20. A game control method carried out by a game console having a game controller, a microprocessor and a non-transitory, computer readable recording medium containing a game control program, which when executed by the microprocessor causes the game console to implement steps comprising:
- changing, in a game field displayed on the display in which an object is located, a position of a light source or a direction of radiation by light emitted from the light source based on a control command of a player through the game controller;
- rendering a shadow of the object projected onto a plane of projection defined in the game field;
- moving a character along the shadow of the object; and
- controlling a gimmick provided in the object and having a predetermined function, wherein:
- the controlling of the gimmick invokes the function provided in the gimmick if the shadow of the object provided with the gimmick is in a predetermined state when the character moves near the shadow of the object provided with the gimmick, and does not invoke the function if the shadow is not in the predetermined state,
- the function is invoked when the shadow of the object provided with the gimmick is in a predetermined shape; and at least two shadows are combined to produce the predetermined shape,
- the gimmick has a function of causing the character to fall,
- the object provided with the gimmick has a through hole, and
- when the shadow of the object provided with the gimmick is provided with a hole derived from the through hole, the module configured to invoke the function invokes the function provided in the gimmick.

* * * * *